United States Patent
Tomomatsu et al.

(10) Patent No.: US 10,173,392 B2
(45) Date of Patent: Jan. 8, 2019

(54) PROCESS FOR PRODUCING ARTICLE FROM LAYERED HARDCOAT OBJECT, AND ARTICLE FORMED FROM LAYERED HARDCOAT OBJECT INCLUDING POLY(METH)ACRYLIMIDE-BASED RESIN LAYER

(71) Applicant: RIKEN TECHNOS CORPORATION, Tokyo (JP)

(72) Inventors: Hiroyuki Tomomatsu, Tokyo (JP); Taketo Hashimoto, Tokyo (JP)

(73) Assignee: RIKEN TECHNOS CORPORATION (JP)

(*) Notice: Subject to any disclaimer, the term of this patent is extended or adjusted under 35 U.S.C. 154(b) by 28 days.

(21) Appl. No.: 15/128,765

(22) PCT Filed: Mar. 10, 2015

(86) PCT No.: PCT/JP2015/056899
§ 371 (c)(1),
(2) Date: Sep. 23, 2016

(87) PCT Pub. No.: WO2015/146565
PCT Pub. Date: Oct. 1, 2015

(65) Prior Publication Data
US 2017/0095993 A1    Apr. 6, 2017

(30) Foreign Application Priority Data

Mar. 24, 2014 (JP) ................... 2014-059526
Mar. 24, 2014 (JP) ................... 2014-059527

(51) Int. Cl.
B32B 7/02        (2006.01)
B32B 27/30       (2006.01)
(Continued)

(52) U.S. Cl.
CPC ............. *B32B 7/02* (2013.01); *B29C 47/065* (2013.01); *B32B 1/00* (2013.01); *B32B 7/12* (2013.01);
(Continued)

(58) Field of Classification Search
USPC ........................................ 428/220
See application file for complete search history.

(56) References Cited

U.S. PATENT DOCUMENTS

2011/0015317 A1    1/2011  Khrenov et al.
2013/0241128 A1*   9/2013  Eda ............... B32B 37/003
                                                269/21
2016/0159995 A1*   6/2016  Nakashi ......... B29C 47/0021
                                                428/355 CN

FOREIGN PATENT DOCUMENTS

JP    S60208337 A    10/1985
JP    H0419142 A     1/1992
(Continued)

OTHER PUBLICATIONS

Machine_English_translation_JP_2003205567_A1; Okumura, K.; Surface Protecting Film for Transparent Conductive Film, and Transparent Conductive Film; Jul. 22, 2003; JPO; whole document.*

(Continued)

*Primary Examiner* — Tahseen Khan
(74) *Attorney, Agent, or Firm* — Bracewell LLP; Brad Y. Chin

(57) ABSTRACT

The present invention pertains to a process for producing an article from a layered hard coat object including a hard coat layer and a transparent-resin film layer in this order from the outermost layer side, the process comprising: a step (A) in which a pressure-sensitive adhesive layer of a support having the pressure-sensitive adhesive layer on at least one surface thereof is temporarily applied to at least one surface (Continued)

of the layered hard coat object to obtain a temporarily support-bearing layered hard coat object; a step (B) in which at least one processing method selected from the group consisting of router processing, water-jet processing, laser processing, and punching is applied to the temporarily support-bearing layered hard coat object to cut the temporarily support-bearing layered hard coat object into a given shape, thereby obtaining a temporarily support-bearing cut article; and a step (C) in which at least one kind of energy selected from the group consisting of heat and actinic rays is applied to the temporarily support-bearing cut article to reduce the strength of tackiness between the support and the article to 2 N/2.5 cm or less.

21 Claims, 3 Drawing Sheets

(51) Int. Cl.
| | | |
|---|---|---|
| G02B 1/14 | (2015.01) | |
| B32B 7/12 | (2006.01) | |
| B32B 27/06 | (2006.01) | |
| B32B 27/16 | (2006.01) | |
| B32B 27/34 | (2006.01) | |
| B29C 47/06 | (2006.01) | |
| B32B 27/36 | (2006.01) | |
| B32B 37/12 | (2006.01) | |
| B32B 38/00 | (2006.01) | |
| B32B 27/08 | (2006.01) | |
| B32B 27/28 | (2006.01) | |
| B32B 1/00 | (2006.01) | |

(52) U.S. Cl.
CPC .............. *B32B 27/06* (2013.01); *B32B 27/08* (2013.01); *B32B 27/16* (2013.01); *B32B 27/281* (2013.01); *B32B 27/30* (2013.01); *B32B 27/308* (2013.01); *B32B 27/34* (2013.01); *B32B 27/365* (2013.01); *B32B 37/12* (2013.01); *B32B 38/0004* (2013.01); *B32B 38/0008* (2013.01); *G02B 1/14* (2015.01); *B32B 2250/24* (2013.01); *B32B 2250/40* (2013.01); *B32B 2255/10* (2013.01); *B32B 2255/26* (2013.01); *B32B 2307/412* (2013.01); *B32B 2307/418* (2013.01); *B32B 2307/536* (2013.01); *B32B 2307/546* (2013.01); *B32B 2307/554* (2013.01); *B32B 2307/58* (2013.01); *B32B 2307/734* (2013.01); *B32B 2457/208* (2013.01); *G06F 2203/04103* (2013.01)

(56) References Cited

FOREIGN PATENT DOCUMENTS

| | | |
|---|---|---|
| JP | H06166714 A | 6/1994 |
| JP | H06256537 A | 9/1994 |
| JP | H09159804 A | 6/1997 |
| JP | H09290427 A | 11/1997 |
| JP | 2000-280268 A | 10/2000 |
| JP | 2002-338702 A | 11/2002 |
| JP | 2003205567 A1 * | 7/2003 |
| JP | 2006-182879 A | 7/2006 |
| JP | 2006-309033 A | 11/2006 |
| JP | 2006-328331 A | 12/2006 |
| JP | 2006-328334 A | 12/2006 |
| JP | 2007-137022 A | 6/2007 |
| JP | 2008-181091 A | 8/2008 |
| JP | 2008-255175 A | 10/2008 |
| JP | 2008-277022 A | 11/2008 |
| JP | 2009-107180 A | 5/2009 |
| JP | 2009-137206 A | 6/2009 |
| JP | 2009-139660 A | 6/2009 |
| JP | 2009-279806 A | 12/2009 |
| JP | 2009-292871 A | 12/2009 |
| JP | 2010-64332 A | 3/2010 |
| JP | 2010-085978 A | 4/2010 |
| JP | 2010-105188 A | 5/2010 |
| JP | 2010-162899 A | 7/2010 |
| JP | 2010-221565 A | 10/2010 |
| JP | 2010-254742 A | 11/2010 |
| JP | 2010-284840 A | 12/2010 |
| JP | 2011-519999 A | 7/2011 |
| JP | 2013-086273 A | 5/2013 |
| JP | 2013-176985 A | 9/2013 |
| JP | 2013208896 A | 10/2013 |
| WO | 2013128697 A1 | 9/2013 |
| WO | WO2015005049 * | 1/2015 |
| WO | 2015040931 A1 | 3/2015 |

OTHER PUBLICATIONS

PCT/JP2015/056899 International Search Report dated Jun. 16, 2015; 4 pgs.
CN201580015767.4 Office Action dated Feb. 24, 2018; 14pgs.
TW104108435 Office Action dated Aug. 15, 2018; 9 pages.

* cited by examiner

PROCESS FOR PRODUCING ARTICLE FROM LAYERED HARDCOAT OBJECT, AND ARTICLE FORMED FROM LAYERED HARDCOAT OBJECT INCLUDING POLY(METH)ACRYLIMIDE-BASED RESIN LAYER

CROSS REFERENCE TO RELATED APPLICATIONS

This application claims the benefit of and priority to PCT/JP2015/056899, filed on Mar. 10, 2015, entitled (translation), "PROCESS FOR PRODUCING ARTICLE FROM LAYERED HARDCOAT OBJECT, AND ARTICLE FORMED FROM LAYERED HARD COAT OBJECT INCLUDING POLY(METH) ACYRLIMIDE-BASED RESIN LAYER," which claims the benefit of and priority to Japanese Patent Application Nos. 2014-059526, filed on Mar. 24, 2014, and 2014-059527, also filed on Mar. 24, 2014, all of which are hereby incorporated by reference in their entirety into this application.

BACKGROUND

Field

Embodiments of the invention relate to a method of producing an article formed from a hard coat laminate. More specifically, embodiments of the invention relate to a method of producing an article, which is formed from a hard coat laminate having high transparency, high surface hardness, high abrasion resistance, and high surface smoothness, and a good appearance, and can be suitably used as a display face plate for a touch panel and a transparent conductive substrate.

In accordance with another embodiment, there is provided an article formed from a hard coat laminate including a poly(meth)acrylic imide resin layer. More specifically, another embodiment of the invention relates to an article, which is formed from a hard coat laminate including a poly(meth)acrylic imide resin layer having high transparency, high surface hardness, high bending resistance, high surface smoothness, a good appearance, high rigidity, high heat resistance, and high dimensional stability, and can be suitably used as a display face plate for a touch panel and a transparent conductive substrate.

Description of the Related Art

In recent years, a touch panel installed on an image display device, such as a liquid crystal display, a plasma display, or an electroluminescent display and allowing the user to perform an input by touching the display with a stylus pen or a finger while viewing the display has been popular.

Conventional display face plates for touch panels and transparent conductive substrates have been formed of articles including glass substrates to satisfy required properties such as heat resistance, dimensional stability, high transparency, high surface hardness, and high rigidity. Unfortunately, glass has disadvantages such as low impact resistance, high fragility, low processability, difficulties in handling, high specific gravity, and difficulties in dealing with the requirements of formation of curved display surfaces and formation of flexible display surfaces. These disadvantages lead to active investigation about materials alternative to glass. A large number of hard coat laminates including a transparent resin film substrate composed of triacetylcellulose, polyethylene terephthalate, polycarbonate, poly(methyl methacrylate), norbornene polymer, and the like, and a hard coat disposed on the surface of the substrate and having high surface hardness and abrasion resistance have been proposed.

These hard coat laminates can be cut into display face plates for touch panels and transparent conductive substrates. At this time, often a support having a pressure-sensitive adhesive layer on at least one surface, such as a surface protective film, may be temporarily bonded to the hard coat laminate to prevent the hard coat laminate from being fouled. Unfortunately, deficits such as generation of cracks tend to be readily caused when such a hard coat laminate having surface hardness and abrasion resistance enhanced for a display face plate for a touch panel and a transparent conductive substrate is subjected to a cutting operation and the support is then peeled off from the hard coat.

These conventional hard coat laminates often have insufficient heat resistance and dimensional stability. Furthermore, deficits such as generation of cracks in the hard coat may be also readily caused at and/or near the curved cutting lines, particularly those having a small curvature radius, during cutting of the hard coat laminate into a display face plate for a touch panel and a transparent conductive substrate.

SUMMARY

A first embodiment of the invention provides a method of producing an article formed from a hard coat laminate, which has high transparency, high surface hardness, high abrasion resistance, high surface smoothness, and a good appearance, and can be suitably used as a display face plate for a touch panel and a transparent conductive substrate while generation of cracks can be suppressed when a temporarily bonded support for prevention of fouling is cut and then peeled off.

A second embodiment of the invention provides an article formed from a hard coat laminate, which has high transparency, high surface hardness, high bending resistance, high surface smoothness, a good appearance, high rigidity, high heat resistance, and high dimensional stability without causing deficits such as generation of cracks in a curved cutting line with a small curvature radius, and can be suitably used as a display face plate for a touch panel and a transparent conductive substrate.

Embodiments of the invention reduce the adhesive strength between a support and an article to a predetermined value or less with heat or active energy rays after a cutting operation and before peeling of the support from the article.

Embodiments of the invention provide that a hard coat laminate including a hard coat layer and a poly(meth)acrylic imide resin layer can exhibit sufficiently high surface hardness because of high rigidity of the poly(meth)acrylic imide resin layer, and deficits such as generation of cracks in the hard coat are not caused by a cutting operation even in articles having curved cutting lines with small curvature radii.

The first embodiment of the invention provides a method of producing an article formed from a hard coat laminate including a hard coat layer and a transparent resin film layer sequentially disposed from a topmost surface layer side, the method including:

(A) a step of temporarily bonding a pressure-sensitive adhesive layer of a support with at least one surface having the pressure-sensitive adhesive layer thereon to at least one surface of the hard coat laminate to prepare a hard coat laminate having a temporarily bonded support;

(B) a step of cutting the hard coat laminate having the temporarily bonded support into a predetermined shape by at least one processing method selected from the group consisting of router machining, water-jet machining, laser machining, and punching to prepare a cut article having a temporarily bonded support; and (C) a step of applying at least one selected from the group consisting of heat and active energy rays to the cut article having the temporarily bonded support to reduce an adhesive strength between the support and the article to 2 N/2.5 cm or less.

In accordance with at least one embodiment, router machining is used in step (B).

In accordance with at least one embodiment, the router machining is performed with a mill having a blade with a cylindrical and round end or with a ball end.

In accordance with at least one embodiment, the mill used in router machining is a mill provided with a nick.

In accordance with at least one embodiment, the end of the blade of the mill is composed of a superhard alloy.

In accordance with at least one embodiment, the hard coat laminate satisfies the following property (i):

(i) at least one surface of the hard coat laminate has a pencil hardness of 7 H or more.

In accordance with at least one embodiment, the hard coat laminate satisfies the following properties (ii) and (iii):

(ii) the hard coat laminate has a total light transmittance of 90% or more; and (iii) the hard coat laminate has a haze of 2.0% or less.

In accordance with at least one embodiment, the hard coat laminate satisfies the following property (iv):

(iv) the hard coat laminate has a minimum bending radius of 40 mm or less.

In accordance with at least one embodiment, the article has a curved cutting line having a curvature radius of 0.1 to 20 mm in a plan view thereof.

In accordance with at least one embodiment, the hard coat laminate includes a hard coat layer (H) and a poly(meth)acrylic imide resin layer ($\alpha$) sequentially disposed from a topmost surface layer side.

In accordance with at least one embodiment, the hard coat laminate includes:

a first hard coat layer (H1);

a poly(meth)acrylic imide resin layer ($\alpha$); and a second hard coat layer (H2), which are sequentially disposed from a topmost surface layer side.

In accordance with at least one embodiment, the hard coat laminate includes:

a first hard coat layer (H1);

a first poly(meth)acrylic imide resin layer ($\alpha 1$);

an aromatic polycarbonate resin layer ($\beta$);

a second poly(meth)acrylic imide resin layer ($\alpha 2$); and a second hard coat layer (H2), which are sequentially disposed from a topmost surface layer side, and the layer $\alpha 1$, the layer $\beta$, and the layer $\alpha 2$ are directly laminated in this order.

An article prepared by the method according to the embodiments discussed above.

Use of the article according to the above embodiments as a touch panel member.

A second embodiment of the invention provides an article formed from a hard coat laminate including a hard coat layer and a poly(meth)acrylic imide resin layer as a transparent resin film layer sequentially disposed from a topmost surface layer side, and having a curved cutting line having a curvature radius of 0.1 to 20 mm in a plan view of the article.

In accordance with at least one embodiment, the hard coat laminate includes:

a first hard coat layer (H1);

a poly(meth)acrylic imide resin layer ($\alpha$); and a second hard coat layer (H2), which are sequentially disposed from a topmost surface layer side.

In accordance with at least one embodiment, the hard coat laminate includes:

a first hard coat layer (H1);

a first poly(meth)acrylic imide resin layer ($\alpha 1$);

an aromatic polycarbonate resin layer ($\beta$);

a second poly(meth)acrylic imide resin layer ($\alpha 2$); and a second hard coat layer (H2), which are sequentially disposed from a topmost surface layer side, and the layer $\alpha 1$, the layer $\beta$, and the layer $\alpha 2$ are directly laminated in this order.

In accordance with at least one embodiment, the hard coat laminate satisfies the following property (i):

(i) at least one surface of the hard coat laminate has a pencil hardness of 7 H or more.

In accordance with at least one embodiment, the hard coat laminate satisfies the following properties (ii) and (iii):

(ii) the hard coat laminate has a total light transmittance of 90% or more; and (iii) the hard coat laminate has a haze of 2.0% or less.

In accordance with at least one embodiment, the hard coat laminate satisfies the following property (iv):

(iv) the hard coat laminate has a minimum bending radius of 40 mm or less.

Use of the article according to any of the embodiments discussed above as a touch panel member.

DETAILED DESCRIPTION

Figure 1:
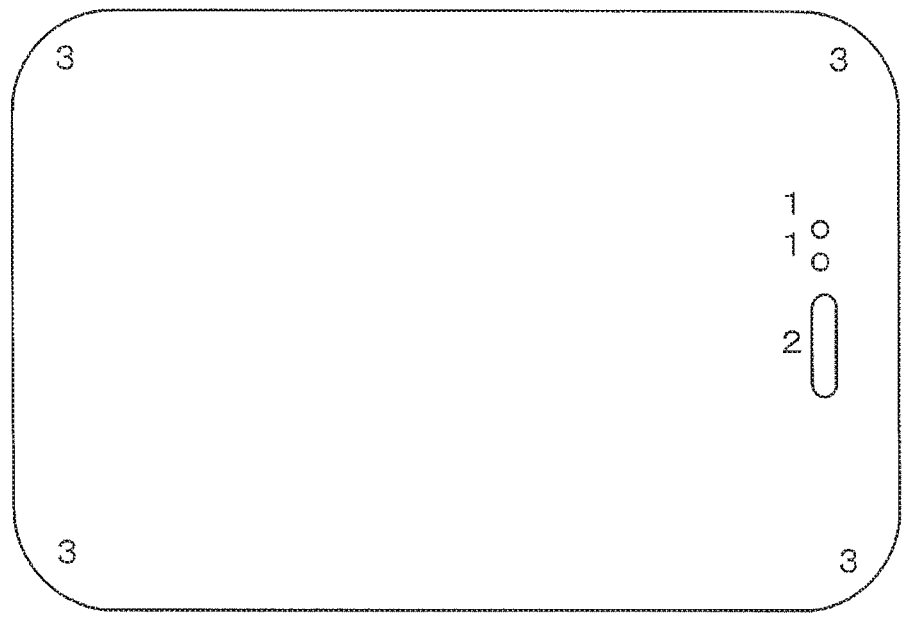
FIG. 1 is a plan view illustrating an example of the article according to an embodiment of the invention.

1. Method of Producing Article Formed from Hard Coat Laminate

The production method according to at least one embodiment is a method of producing an article formed from a hard coat laminate including a hard coat layer and a transparent resin film layer sequentially disposed from a topmost surface layer side, the method including (A) a step of temporarily bonding a pressure-sensitive adhesive layer of a support with at least one surface having the pressure-sensitive adhesive layer thereon to at least one surface of the hard coat laminate to prepare a hard coat laminate having a temporarily bonded support.

The term "surface layer side" referred to herein is intended to mean being located closer to the outer surface when the article formed from a hard coat laminate having a multilayer structure is practically used (e.g., a touch surface in the case of a touch panel display face plate).

In accordance with at least one embodiment, the hard coat layer of the hard coat laminate is not limited to a single layer, but may be composed of two or more layers. Among these hard coat layers, at least one hard coat layer is arranged to form the topmost surface layer of the hard coat laminate so that the article produced by the production method according to at least one embodiment can have high surface hardness and abrasion resistance. The transparent resin film layer is not limited to a single layer, but may be composed of two or more layers. Furthermore, the hard coat laminate may include any optional layer(s) other than the hard coat layer and the transparent resin film layer, as desired. Examples of such an optional layer(s) include an anchor coat layer, a pressure-sensitive adhesive layer, a transparent conductive layer, a high refractive index layer, a low refractive index layer, and an anti-glare layer.

In the hard coat laminate, the surface of the hard coat layer on the topmost surface layer side has (i) a pencil hardness of preferably 7 H or more, more preferably 8 H or more, still more preferably 9 H or more so that an article which can be suitably used as a display face plate for a touch panel and a transparent conductive substrate can be produced. The pencil hardness referred to herein is measured according to the procedure (1) described below.

In accordance with at least one embodiment, the hard coat laminate is required to have high transparency and be not colored because the article produced by the production method according to at least one embodiment is often used as a display face plate for a touch panel and a transparent conductive substrate. For this reason, the hard coat laminate has (ii) a total light transmittance of usually 85% or more, preferably 90% or more, more preferably 92% or more. The total light transmittance referred to herein is measured according to the procedure (2) in Examples below. A higher total light transmittance is preferred. The hard coat laminate has (iii) a haze of usually 2.5% or less, preferably 2.0% or less, more preferably 1.5% or less. The haze referred to herein is measured according to the procedure (3) in Examples below. A lower haze is preferred. Furthermore, the hard coat laminate has a yellowness index of preferably 3 or less, more preferably 2 or less, still more preferably 1 or less. The yellowness index referred to herein is measured according to the procedure (7) in Examples below.

Furthermore, the hard coat laminate preferably has (iv) a minimum bending radius of 40 mm or less. The minimum bending radius referred to herein is measured according to the procedure (4) in Examples below. Satisfaction of the property (iv) can facilitate handling of the hard coat laminate as a film roll, which leads to advantages such as higher production efficiency. A smaller minimum bending radius is preferred. The minimum bending radius is more preferably 30 mm or less, still more preferably 20 mm or less.

In accordance with at least one embodiment, the minimum bending radius indicates a bending radius immediately before cracks are generated on the surface of the bent portion of the hard coat laminate when bended, which is an index representing the bending limit. The bend radius is defined in the same manner as in the curvature radius described later.

Any coating material for forming the hard coat layer can be used without limitation as long as the coating material can be formed into a hard coat layer having high transparency, high difficulty in coloring, high surface hardness, and high abrasion resistance and excellent cutting processability.

Examples of preferred coating materials for forming the hard coat layer include an active energy ray-curable resin composition.

In accordance with at least one embodiment, the active energy ray-curable resin composition can be polymerized and cured by active energy rays such as ultraviolet rays or electron beams to form a hard coat. Examples of such a composition include one including both an active energy ray curable resin and a compound having two or more isocyanate groups (—N=C=O) in the molecule and/or a photopolymerization initiator.

Examples of the active energy ray curable resin include resins including one or more members selected from the following groups: (meth)acryloyl group-containing prepolymers or oligomers such as polyurethane (meth)acrylate, polyester (meth)acrylate, polyacrylic (meth)acrylate, epoxy (meth)acrylate, polyalkyleneglycol poly(meth)acrylate, and polyether (meth)acrylate; (meth)acryloyl group-containing monofunctional reactive monomers such as methyl (meth)acrylate, ethyl (meth)acrylate, n-butyl (meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth)acrylate, phenylcellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth)acrylate, and trimethylsiloxyethyl methacrylate; monofunctional reactive monomers such as N-vinylpyrrolidone and styrene; (meth)acryloyl group-containing bifunctional reactive monomers such as diethyleneglycol di(meth)acrylate, neopentylglycol di(meth)acrylate, 1,6-hexanediol di(meth)acrylate, polyethyleneglycol di(meth)acrylate, 2,2'-bis(4-(meth)acryloyloxypolyethyleneoxyphenyl)propane, and 2,2'-bis(4-(meth)acryloyloxypolypropyleneoxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; and (meth)acryloyl group-containing hexafunctional reactive monomers such as dipentaerythritol hexaacrylate; and resins, as the constitutional monomer(s), having one or more members selected from the above monomers. These active energy ray curable resins can be used singly or in the form of a mixture of two or more.

In accordance with at least one embodiment, the term "(meth)acrylate" referred to herein represents acrylate or methacrylate.

Examples of the compound having two or more isocyanate groups in the molecule include methylene bis-4-cyclohexyl isocyanate; polyisocyanates such as trimethylolpropane adducts of tolylene diisocyanate, trimethylolpropane adducts of hexamethylene diisocyanate, trimethylolpropane adducts of isophorone diisocyanate, isocyanurates of tolylene diisocyanate, isocyanurates of hexamethylene diisocyanate, isocyanurates of isophorone diisocyanate, and biurets of hexamethylene diisocyanate; and urethane cross-linking agents such as blocked isocyanates of these polyisocyanates. These compounds can be used singly or in combinations of two or more. A catalyst such as dibutyltin dilaurate or dibutyltin diethylhexoate may be added to a crosslinking reaction system when necessary.

Examples of the photopolymerization initiator include benzophenone compounds such as benzophenone, methylo-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyebenzophenone, and 2,4,6-trimethylbenzophenone; benzoin compounds such as benzoin, benzoin methyl ether, benzoin ethyl ether, benzoin isopropyl ether, and benzyl methyl ketal; acetophenone compounds such as acetophenone, 2,2-dimethoxy-2-phenylacetophenone, and 1-hydroxycyclohexyl phenyl ketone; anthraquinone compounds such as methyl anthraquinone, 2-ethylanthraquinone, and 2-amylanthraquinone; thioxanthone compounds such as thioxanthone, 2,4-diethylthioxanthone, and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetic acid ester compounds; hydroxy ketone compounds; and aminobenzoate compounds. These compounds can be used singly or in combinations of two or more.

In accordance with at least one embodiment, the active energy ray-curable resin composition may contain one or two or more additives such as antistatic agents, surfactants, leveling agents, thixotropic agents, anti-fouling agents, printing property improvers, antioxidants, weatherability stabilizers, light stabilizers, ultraviolet absorbing agents, heat stabilizers, colorants, and fillers, if desired.

Preferable examples of the optional components which can be added to the active energy ray-curable resin composition include fine particles having an average particle size of 1 to 300 nm. The surface hardness of the hard coat layer can be enhanced through use of the fine particles in an amount of 1 to 300 parts by mass, preferably 20 to 100 parts by mass relative to 100 parts by mass of the active energy ray-curable resin component.

In accordance with at least one embodiment, the fine particles to be used may be inorganic fine particles or organic fine particles. Examples of the inorganic fine particles include silica (silicon dioxide); fine particles of a metal oxide such as aluminum oxide, zirconia, titania, zinc oxide, germanium oxide, indium oxide, tin oxide, indium tin oxide, antimony oxide, and cerium oxide; fine particles of a metal fluoride such as magnesium fluoride and sodium fluoride; fine particles of a metal sulfides; fine particles of a metal nitride; and metal fine particles. Examples of the organic fine particles include resin beads composed of a styrenic resins, an acrylic resin, a polycarbonate resin, an ethylenic resin, and a cured resin of an amino compound and formaldehyde. These resins can be used singly or in combinations two or more.

To enhance the dispersibility of the fine particles in the coating material or increase the surface hardness of the resulting hard coat layer, the surface of the fine particles may be treated with a silane coupling agent such as a vinyl silane or an aminosilane; a titanate coupling agent; an aluminate coupling agent; an organic compound having an ethylenically unsaturated bonding group such as a (meth)acryloyl group, a vinyl group, and an allyl group or a reactive functional group such as an epoxy group; or a surface treatment agent such as a fatty acid or a fatty acid metal salt.

Among these fine particles, preferred are silica or aluminum oxide fine particles, more preferred are silica fine particles to provide a hard coat layer having a greater level of surface hardness. Examples of commercially available products of silica fine particles include SNOWTEX (trade name) from Nissan Chemical Industries, Ltd., and Quartron (trade name) from Fuso Chemical Co., Ltd.

In accordance with at least one embodiment, the fine particles preferably have an average particle size of 300 nm or less to keep the transparency of the hard coat layer and to have an effect of improving the surface hardness of the hard coat layer. The upper limit of the average particle size is preferably 200 nm or less, more preferably 120 nm or less. The lower limit of the average particle size is not limited in particular; the lower limit of usually available fine particles is about 1 nm at finest.

In accordance with at least one embodiment, the average particle size of the fine particles referred to herein is defined as a particle diameter at which the cumulative mass of particles starting from a particle having the smallest diameter reaches 50% in the particle diameter distribution curve obtained through measurement with a laser diffraction-scattering particle size analyzer "MT3200 II (trade name)" from Nikkiso Co., Ltd.

In accordance with at least one embodiment, the active energy ray-curable resin composition may contain a solvent, if desired in order to dilute it to a concentration easy to apply the resin composition to a surface. Any solvent can be used without limitation as long as the solvent is not reactive with the components of the curable resin composition or any other optional component(s), or does not catalyze (promote) self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone.

In accordance with at least one embodiment, the active energy ray-curable resin composition is prepared through mixing of these components with stirring.

In accordance with at least one embodiment, the method for obtaining the hard coat layer using the coating material for forming a hard coat layer, such as an active energy ray-curable resin composition, on the transparent resin film layer or other optional layer(s) can be performed by a known web application method without limitation. Specifically, examples of the method include methods such as roll coating, gravure coating, reverse coating, roll brush, spray coating, air knife coating, and die coating.

In accordance with at least one embodiment, the hard coat layer formed as the topmost surface layer of the hard coat laminate preferably has a thickness of 17 μm or more from the viewpoint of having a pencil hardness of 7 H or more. The thickness of the hard coat layer is more preferably 20 μm or more, still more preferably 25 μm or more. The hard coat layer has a thickness of preferably 100 μm or less, more preferably 50 μm or less from the viewpoint of keeping excellent cutting processability and handling properties of the web.

In accordance with at least one embodiment, the hard coat laminate preferably has the hard coat layer formed on both surfaces thereof. For example, usually, significantly different properties are required for the touch surface and the printing surface of a touch panel display face plate. Such different required properties can be satisfied through formation of hard coat layers on the touch surface and the printing surface (on both the surface layers of the hard coat laminate) so as to meet the respective required properties. Curl of the hard coat laminate can be prevented through appropriately optimizing the thickness of each of the hard coat layers, by which a cutting operation can be facilitated.

In accordance with at least one embodiment, the transparent resin film layer is a layer serving as a transparent film substrate for forming the hard coat layer. Any transparent resin film having high transparency and not colored can be used for the transparent resin film layer without limitation. Examples of the transparent resin film include films of a cellulose ester resin such as triacetylcellulose; films of a polyester resin such as polyethylene terephthalate; films of a cyclic hydrocarbon resin such as an ethylene norbornene copolymer; films of an acrylic resin such as polymethyl methacrylate and polyethyl methacrylate; films of a poly(meth)acrylic imide resin; films of an aromatic polycarbonate resin; films of a polyolefin resin such as polypropylene and 4-methyl-pentene-1; films of a polyamide resin; films of a polyarylate resin; films of a polymer-type urethane acrylate resin; and films of a polyimide resin. The transparent resin film includes non-stretched films, monoaxially stretched films, and biaxially stretched films. The transparent resin film can have any thickness without limitation, as desired. The transparent resin film may have a thickness of usually 20 μm or more, preferably 50 μm or more from the viewpoint of handling properties when the method according to an embodiment of the invention is performed. If the article produced by the method according to at least one embodiment is used as a display face plate for a touch panel, the transparent resin film may have a thickness of usually 100 μm or more, preferably 200 μm or more, more preferably 300 μm or more from the viewpoint of keeping the rigidity. The transparent resin film may have a thickness of usually 1500 μm or less, preferably 1200 μm or less, more preferably 1000 μm or less to satisfy the demand for further thinning touch panels. If the article produced by the method according to at least one embodiment is used in other applications not requiring as high rigidity as in a display face plate for a touch panel, the transparent resin film may have a thickness of usually 250 μm or less, preferably 150 μm or less from the viewpoint of economy.

In accordance with at least one embodiment, the hard coat laminate preferably includes a hard coat layer (H) and a poly(meth)acrylic imide resin layer (α) sequentially disposed from the topmost surface layer side to provide an article which has high surface hardness, high abrasion resistance, high transparency, high surface smoothness, a good appearance, high rigidity, high heat resistance, and high dimensional stability, and can be suitably used as a display face plate for a touch panel and a transparent conductive substrate.

More preferably, the hard coat laminate includes a first hard coat layer (H1), a poly(meth)acrylic imide resin layer (α), and a second hard coat layer (H2) sequentially disposed from the topmost surface layer side. Such a hard coat laminate further has high curl resistance to enhance the workability or the work efficiency in step (B) or step (C).

Still more preferably, the hard coat laminate includes a first hard coat layer (H1), a first poly(meth)acrylic imide resin layer (α1), an aromatic polycarbonate resin layer (β), a second poly(meth)acrylic imide resin layer (α2), and a second hard coat layer (H2) sequentially disposed from the topmost surface layer side, and the layer α1, the layer β, and the layer α2 are directly laminated in this order. Such a hard coat laminate has further enhanced cutting processability, by which the workability or the work efficiency in step (B) can be further improved.

In accordance with at least one embodiment, the layer α is a layer composed of a poly(meth)acrylic imide resin film to serve as a transparent film substrate for forming a hard coat layer. Similarly, the layer composed of the layer α1, the layer β, and the layer α2 directly laminated in this order is a multi-layered transparent film, which serves as a transparent film substrate for forming the layer H1 and the layer H2.

In accordance with at least one embodiment, the poly(meth)acrylic imide resin is a thermoplastic resin keeping high transparency, high surface hardness, and high rigidity of acrylic resins as they are while the characteristics of excellent heat resistance and dimensional stability of polyimide resins are introduced and a disadvantage thereof, i.e., coloring from light yellow to reddish brown is improved. Such poly(meth)acrylic imide resins are disclosed in JP 2011-519999 A, for example. The term "poly(meth)acrylic imide" referred to herein is intended to include both polyacrylic imide or polymethacrylic imide.

Examples of preferred poly(meth)acrylic imide resins used in at least one embodiment include those having a yellowness index (measured according to JIS K7105:1981) of 3 or less. The yellowness index is more preferably 2 or less, still more preferably 1 or less. Examples of preferred poly(meth)acrylic imide resins include those having a melt mass-flow rate (measured according to ISO1133 under the conditions at 260° C. and 98.07 N) of 0.1 to 20 g/10 min from the viewpoint of the extrusion load during film formation and the stability of the melted film. The melt mass-flow rate ranging from 0.5 to 10 g/10 min is more preferred. Furthermore, the poly(meth)acrylic imide resin preferably has a glass transition temperature of 150° C. or more from the viewpoint of heat resistance. The glass transition temperature is more preferably 170° C. or more.

In accordance with at least one embodiment, the poly(meth)acrylic imide resins may further include an optional additive(s) such as thermoplastic resins other than the poly(meth)acrylic imide resins; pigments, inorganic fillers, organic fillers and resin fillers; and lubricants, antioxidants, weatherability stabilizers, heat stabilizers, mold release agents, antistatic agents, and surfactants, as desired, to an extent not impairing the embodiments of the invention. The amount of the optional component(s) to be used is usually about 0.01 to 10 parts by mass relative to 100 parts by mass of the poly(meth)acrylic imide resin.

Examples of commercially available poly(meth)acrylic imide resins include "PLEXIMID TT70 (trade name)" from Evonik Industries AG.

In accordance with at least one embodiment, the layer α can have any thickness without limitation, as desired. The layer α may have a thickness of usually 20 μm or more, preferably 50 μm or more from the viewpoint of handling properties when the method according to at least one embodiment is performed. If the article produced by the method according to at least one embodiment is used as a display face plate for a touch panel, the layer α may have a thickness of usually 100 μm or more, preferably 200 μm or more, more preferably 300 μm or more from the viewpoint of keeping the rigidity. The layer α may have a thickness of usually 1500 μm or less, preferably 1200 μm or less, more preferably 1000 μm or less from the viewpoint of meeting the requirements for further thinning touch panels. If the article produced by the method according to at least one embodiment is used in other applications not requiring as high rigidity as in a display face plate for a touch panel, the layer α may have a thickness of usually 250 μm or less, preferably 150 μm or less from the viewpoint of economy.

In accordance with at least one embodiment, the total thickness of the layer α1, the layer β, and the layer α2 is not limited in particular; these layers may have any total thickness as desired. The total thickness of these layers may be usually 20 μm or more, preferably 50 μm or more from the viewpoint of handling properties when the method according to at least one embodiment is performed. If the article produced by the method according to at least one embodiment is used as a display face plate for a touch panel, the total thickness of these layers may be usually 100 μm or more, preferably 200 μm or more, more preferably 300 μm or more from the viewpoint of keeping the rigidity. The total thickness of these layers may be usually 1500 μm or less, preferably 1200 μm or less, more preferably 1000 μm or less in order to meet the requirements for further thinning touch panels. If the article produced by the method according to at least one embodiment is used in other applications not requiring as high rigidity as in a display face plate for a touch panel, the total thickness of these layers may be usually 250 μm or less, preferably 150 μm or less from the viewpoint of economy.

In accordance with at least one embodiment, the layer α1 can have any layer thickness without limitation. The layer thickness may be usually 20 μm or more, preferably 40 μm or more, more preferably 60 μm or more to keep high surface hardness such that the article produced by the method according to at least one embodiment can be suitably used as a display face plate for a touch panel. The layer α2 can have any layer thickness without limitation. The layer α2 preferably has the same layer thickness as that of the layer α1 from the viewpoint of the curl resistance of the hard coat laminate. The layer β can have any layer thickness without limitation. The layer thickness may be usually 20 μm or more, preferably 80 μm or more, more preferably 120 μm or more from the viewpoint of the cutting processability of the hard coat laminate.

Here, "the same layer thickness" should not be construed as the same layer thickness in a physicochemically strict sense. It should be construed as the same layer thickness within the range of fluctuations of usually industrially performed process and quality control because when the above α1 layer and the above α2 layer have the same layer thickness within the range of fluctuations of usually industrially performed process and quality control, the curling resistance of the transparent multilayer film can be kept well. In the case of an unstretched multilayer film formed by T-die coextrusion, it is usually subjected to process and quality control in the range of about −5 to +5 μm, and therefore a layer thickness of 65 μm and a layer thickness of 75 μm should be construed as the same. "The same layer thickness" here can also be reworded as "substantially the same layer thickness."

In accordance with at least one embodiment, the layer α1 and the layer α2 can be composed of the same poly(meth)acrylic imide resin as one used in the layer α.

For the poly(meth)acrylimide resin used for the above α1 layer and the poly(meth)acrylimide resin used for the above α2 layer, those having different resin properties, for example, poly(meth)acrylimide resins having different melt mass flow rates or glass transition temperatures, may be used. Those having the same resin properties are preferably used, however, from the viewpoint of the curling resistance of the transparent multilayer film. For example, using the same lot of the same grade for the poly(meth)acrylimide resins is one of the preferred embodiments.

As the aromatic polycarbonate resin used for the above β layer, for example, one or a mixture of two or more types of aromatic polycarbonate resins such as a polymer obtained by the interfacial polymerization of an aromatic dihydroxy compound such as bisphenol A, dimethylbisphenol A, or 1,1-bis(4-hydroxyphenyl)-3,3,5-trimethylcyclohexane and phosgene; and a polymer obtained by the transesterification reaction of an aromatic dihydroxy compound such as bisphenol A, dimethylbisphenol A, or 1,1-bis(4-hydroxyphenyl)-3,3,5-trimethylcyclohexane and a carbonic acid diester such as diphenyl carbonate can be used.

Examples of a preferred optional component(s) that can be contained in the above aromatic polycarbonate resin include a core-shell rubber. By using the core-shell rubber in an amount of 0 to 30 parts by mass (100 to 70 parts by mass of the aromatic polycarbonate resin), preferably 0 to 10 parts by mass (100 to 90 parts by mass of the aromatic polycarbonate resin), when the sum of the aromatic polycarbonate resin and the core-shell rubber is 100 parts by mass, the cutting processability and the impact resistance of the aromatic polycarbonate resin layer can be more enhanced.

Examples of the above core-shell rubber include one or a mixture of two or more types of core-shell rubbers such as methacrylate-styrene/butadiene rubber graft copolymers, acrylonitrile-styrene/butadiene rubber graft copolymers, acrylonitrile-styrene/ethylene-propylene rubber graft copolymers, acrylonitrile-styrene/acrylate graft copolymers, methacrylate/acrylate rubber graft copolymers, and methacrylate-acrylonitrile/acrylate rubber graft copolymers.

In addition, additives such as a thermoplastic resin other than the aromatic polycarbonate resin and the core-shell rubber; a pigment, an inorganic filler, an organic filler, and a resin filler; and a lubricant, an antioxidant, a weather resistance stabilizer, a heat stabilizer, a release agent, an antistatic agent, and a surfactant, and the like can be further blended in the above aromatic polycarbonate resin as desired, within the limits not contrary to the embodiments of the invention. The amount of these optional component(s) blended is usually about 0.01 to 10 parts by mass when the sum of the aromatic polycarbonate resin and the core-shell rubber is 100 parts by mass.

In accordance with at least one embodiment, the method for obtaining the above poly(meth)acrylimide resin film of the α layer is not particularly limited. Examples thereof include a method including the steps of (α) continuously extruding a melted film of the poly(meth)acrylimide resin from a T die using an apparatus including an extruder and the T die; and (b) supplying and charging the above melted film of the poly(meth)acrylimide resin between a first rotating or circulating mirror-finished body and a second rotating or circulating mirror-finished body and pressing the melted film.

Similarly, the method for obtaining the above transparent multilayer film in which the layer (α1); the layer (β); and the layer (α2) are directly laminated in this order is not particularly limited. Preferred examples thereof include a method including the steps of (a') continuously coextruding a melted film of a transparent multilayer film in which a first poly(meth)acrylimide resin layer (α1); an aromatic polycarbonate resin layer (β); and a second poly(meth)acrylimide resin layer (α2) are directly laminated in this order from a T die using a coextrusion apparatus including an extruder and the T die; and (b') supplying and charging the above melted film of the transparent multilayer film between a first rotating or circulating mirror-finished body and a second rotating or circulating mirror-finished body and pressing the melted film.

In the above step (α) or the above step (a'), as the above T die, any known one can be used. Examples thereof include a manifold die, a fishtail die, and a coat hanger die.

As the above coextrusion apparatus, any known one can be used. Examples thereof include feed-block type, multi-manifold type, and stack-plate type coextrusion apparatuses.

As the above extruder to be used in the above step (α) or the above step (a'), any known one can be used. Examples thereof include a single-screw extruder, a co-rotating twin-screw extruder, and a counter-rotating twin-screw extruder.

In addition, in order to suppress the deterioration of the poly(meth)acrylimide resin and the aromatic polycarbonate resin, one of preferred methods is that the interior of the extruder is subjected to a purge operation with nitrogen.

In accordance with at least one embodiment, the poly(meth)acrylimide resin is a resin having high moisture absorbency and therefore is preferably dried before being subjected to film formation. In addition, it is also preferred that the dried poly(meth)acrylimide resin is directly transported from the dryer to the extruder and charged. The set temperature of the dryer is preferably 100 to 150° C. In addition, it is also preferred that the extruder (typically, the measuring zone at the screw tip of the extruder) is equipped with a vacuum vent.

In accordance with at least one embodiment, the temperature of the above T die used in the above step (α) or the above step (a') is preferably set at 260° C. or more in order to stably perform the step of continuously extruding or coextruding the melted film of the poly(meth)acrylimide resin or the above melted film of the transparent multilayer film. More preferably, the temperature is 270° C. or more. In addition, in order to suppress the deterioration of the poly(meth)acrylimide resin and the aromatic polycarbonate resin, the temperature of the T die is preferably set at 350° C. or less.

In accordance with at least one embodiment, the ratio (R/T) of the lip opening (R) to the thickness (T) of the resulting poly(meth)acrylic imide resin film or transparent multilayer film is preferably 1 to 10. The ratio is more preferably 1.5 to 5. The ratio (R/T) of 10 or less can prevent retardation. The ratio (R/T) of 1 or more can keep an appropriate extrusion load.

Examples of the above first mirror-finished body used in the above step (b) or the above step (b') include a mirror-finished roll and a mirror-finished belt. In addition, examples of the above second mirror-finished body include a mirror-finished roll and a mirror-finished belt.

In accordance with at least one embodiment, the above mirror-finished roll is a roll whose surface is mirror-finished. The above mirror-finished roll includes those made of metals, ceramics, and silicone rubbers. In addition, the surface of the mirror-finished roll can be subjected to a chrome plating treatment, an iron-phosphorus alloy plating treatment, a hard carbon treatment by PVD or CVD, or the like for the purpose of protection from corrosion and scratching.

In accordance with at least one embodiment, the above mirror-finished belt is a seamless belt usually made of a metal whose surface is mirror-finished. The mirror-finished belt is arranged, for example, to loop around a pair of belt rollers and circulate between them. In addition, the surface of the mirror-finished belt can be subjected to a chrome plating treatment, an iron-phosphorus alloy plating treatment, a hard carbon treatment by PVD or CVD, or the like for the purpose of protection from corrosion and scratching.

In accordance with at least one embodiment, the above mirror finishing is not limited and can be performed by any method. Examples thereof include a method of performing polishing using fine abrasive grains to set the arithmetic average roughness (Ra) of the surface of the above mirror-finished body at preferably 100 nm or less, more preferably 50 nm or less, and set the ten-point average roughness (Rz) at preferably 500 nm or less, more preferably 250 nm or less.

Though there is no intention of being bound by any theory, it can be considered that a poly(meth)acrylimide resin film or a transparent multilayer film having excellent transparency, surface smoothness, and appearance is obtained by the above film forming method. That is because the melted film of the poly(meth)acrylimide resin film or the transparent multilayer film is pressed by the first mirror-finished body and the second mirror-finished body, and thus the highly smooth surface states of the first mirror-finished body and the second mirror-finished body are transferred to the film to correct faulty portions such as die streaks.

In order that the above transfer of the surface states is performed well, the surface temperature of the first mirror-finished body is preferably 100° C. or more, more preferably 120° C. or more, and further preferably 130° C. or more. On the other hand, in order to prevent the development on the film of appearance faults (exfoliation marks) accompanying the peeling-off from the first mirror-finished body, the surface temperature of the first mirror-finished body is made to be preferably 200° C. or lower, and more preferably 160° C. or lower.

In order that the above transfer of the surface states is performed well, the surface temperature of the second mirror-finished body is preferably 20° C. or more, more preferably 60° C. or more, and further preferably 100° C. or more. On the other hand, in order to prevent the development on the film of appearance faults (exfoliation marks) accompanying the peeling-off from the second mirror-finished body, the surface temperature of the second mirror-finished body is made to be preferably 200° C. or lower, and more preferably 160° C. or lower.

In accordance with at least one embodiment, the surface temperature of the first mirror-finished body is preferably higher than the surface temperature of the second mirror-finished body. This is because the film is held by the first mirror-finished body and fed to the next transport roll.

When the hard coat is formed, the hard coat-layer forming surface or both surfaces of the poly(meth)acrylic imide resin film or the transparent multilayer film serving as a transparent film substrate may previously be subjected to an easy-adhesion treatment such as a corona discharge treatment or an anchor coat formation in order to enhance the adhesive strength.

If the corona discharge treatment is performed, a higher interlayer adhesive strength can be obtained through control of the wetting index (measured according to JIS K6768: 1999) to be usually 50 mN/m or more, preferably 60 mN/m or more. After the corona discharge treatment is performed, an anchor coat layer may be further formed.

In accordance with at least one embodiment, the corona discharge treatment involves passing the film between an insulated electrode and a dielectric roll, and applying a high-frequency high-voltage therebetween to generate a corona discharge thereby treating the film surface. The corona discharge ionizes oxygen and the like; and the ions collide against the film surface. This can cause the scission of resin molecule chains and the addition of oxygen-containing functional groups to resin molecule chains on the film surface thereby increasing the wetting index.

In accordance with at least one embodiment, the amount of the treatment (S) per unit area and unit time of the corona discharge treatment can be determined so as to have a wetting index falling within the aforementioned range. The amount of the treatment (S) is typically 80 W·min/m$^2$ or more, preferably 120 W·min/m$^2$ or more. The amount of the treatment (S) is preferably reduced to 500 W·min/m$^2$ or less in order to prevent the film from degradation. More preferably, the amount of the treatment (S) is 400 W·min/m$^2$ or less.

Here, the amount of the treatment (S) is defined by the following expression.

$$S = P/(L \cdot V)$$

wherein,
S: an amount of a treatment (W·min/m$^2$);
P: a discharge power (W);
L: a length of the discharge electrode (m); and
V: a line velocity (m/min)

An anchor coat agent for forming the anchor coat is not especially limited as long as having a high transparency and exhibiting no coloration. As the anchor coat agent, there can be used, for example, a known one such as a polyester, an acrylic, a polyurethane, an acrylic urethane and a polyester urethane. Among these, a thermoplastic urethane anchor coat agent is preferable from the viewpoint of improving the adhesive strength with the hard coat.

Further as the anchor coat agent, there may be used a coating material containing a silane coupling agent. The silane coupling agent may be silane compounds having at least two different reactive groups selected from a hydrolyzable group (for example, an alkoxy group such as a methoxy group and an ethoxy group, an acyloxy group such as an acetoxy group, and a halogen group such as a chloro group), and an organic functional group (for example, an amino group, a vinyl group, an epoxy group, a methacryloxy group, an acryloxy group and an isocyanate group). Such a silane coupling agent functions to improve the adhesive strength with the hard coat. Among these, from the viewpoint of improving the adhesive strength with the hard coat, silane coupling agents having an amino group are preferable.

In accordance with at least one embodiment, the coating material containing the silane coupling agent may be one containing the silane coupling agent as the main component (50 mass % or more in terms of the solid content). It is preferred that 75 mass % or more, further preferably 90 mass % or more of the solid content of the coating material is the silane coupling agent.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane. These the silane coupling agents may be used singly or as a mixture of two or more types of them.

A method for forming the anchor coat layer is not especially limited, and a known web coating method can be used. Specific examples of the method include methods of roll coating, gravure coating, reverse coating, roll brushing, spray coating, air knife coating, die coating and the like. At this time, as required, there can be used an optional diluting solvent(s), for example, methanol, ethanol, 1-methoxy-2-propanol, n-butyl acetate, toluene, methyl ethyl ketone, methyl isobutyl ketone, ethyl acetate and acetone.

Further the anchor coat agent may contain, within the limits of not being contrary to the various embodiments of the invention, one or two or more additives such as antioxidants, weather-resistance stabilizers, light-resistance stabilizers, ultraviolet absorbents, thermal stabilizers, antistatic agents, surfactants, colorants, infrared blocking agents, leveling agents, thixotropy imparting agents and fillers.

In accordance with at least one embodiment, the thickness of the anchor coat is usually about 0.01 to 5 µm, and preferably 0.1 to 2 µm.

In accordance with at least one embodiment, the support is also referred to as a protective film, a support film, and a process paper. The film substrate of the support has a pressure-sensitive adhesive layer on at least one surface thereof. The pressure-sensitive adhesive layer of the support is temporarily bonded to at least one surface, usually both surfaces of the hard coat laminate in order to prevent the product article from being fouled when the hard coat laminate is subjected to a cutting operation. The support is usually peeled and removed off from the article when assembling a touch panel or the like with the use of the article as a member. The term "temporarily" in "temporarily bonded" is intended to represent that the support is going to be peeled and removed off from the article, as described above.

Any pressure-sensitive adhesive for forming the pressure-sensitive adhesive layer of the support can be used without limitation as long as the adhesive strength between the support and the article can be reduced to 2 N/2.5 cm or less with heat or active energy rays in step (C). Preferred is a pressure-sensitive adhesive which can be completely peeled off without leaving any glue after peeling and removal of the support from the article after step (C). The pressure-sensitive adhesive layer can have any thickness without limitation, but the thickness is usually 0.5 to 200 µm.

In accordance with at least one embodiment, the adhesive strength referred to herein is determined when a cut test piece having a width of 25 mm and a length of 80 mm is prepared and then subjected to conditioning in an environment at a temperature of 23° C. and a relative humidity of 50% for 24 hours or more, and a 180° peel test is performed on the test piece at a rate of 300 mm/min under the same environment. When peeling the support off from the article, the support is held at corners, and is 180° turned onto the rear surface of the support, which results in that the support is 25 mm peeled off from the article. One end of the article in the peeled portion is fixed to one chuck of a tensile tester, and the support is fixed to the other chuck. The measured values in the initial portion of 15 mm in length from the start of the measurement were neglected, and the measured adhesive values in the subsequent portion of 25 mm in length are averaged. This average is used as the value of peeling adhesive in calculation of the adhesive strength. The test method is basically performed according to JIS Z0237:2009. However, the size of the sample is made different from that specified in JIS Z0237:2009 so that the measurement can be conducted for samples prepared from display face plates for smart phones.

Examples of such pressure-sensitive adhesives, which can reduce the adhesive strength through curing by heat or active energy rays, include pressure-sensitive adhesives having two or more reactive functional groups in the molecule, such as an amino group, a vinyl group, an epoxy group, a methacryloxy group, an acryloxy group, and an isocyanate group; and pressure-sensitive adhesive compositions including the pressure-sensitive adhesive and at least one of an isocyanate curing agent, a photopolymerization initiator and an organic peroxide. Examples of pressure-sensitive adhesives which can be foamed by heat or active energy rays so as to decrease the gross adhesive area and reduce the adhesive strength include pressure-sensitive adhesives containing a foaming agent.

In accordance with at least one embodiment, the isocyanate curing agent is a compound having two or more isocyanate groups in the molecule. Examples thereof include those listed in the above description of the hard coat layer. These isocyanate curing agents can be used singly or in the form of a mixture of two or more.

Examples of the photopolymerization initiator include those listed in the above description of the hard coat layer. These photopolymerization initiators can be used singly or in the form of a mixture of two or more.

Examples of the organic peroxide include dicumyl peroxide, di-tert-butyl peroxide, 2,5-dimethyl-2,5-di-(tert-butylperoxy)hexane, 2,5-dimethyl-2,5-di(tert-butylperoxy) hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxyisopropyl carbonate, diacetyl peroxide, lauroyl peroxide, and tert-butylcumyl peroxide, etc. These organic peroxides can be used singly or in the form of a mixture of two or more.

Examples of the foaming agent include thermally expandable microcapsules; azo compounds such as an azodicarboxylic amide; nitroso compounds such as N,N'-dinitrosopentamethylenetetramine; hydrogen carbonate salts such as sodium hydrogen carbonate and ammonium hydrogen carbonate; organic acids such as citric acid, sodium citrate, and oxalic acid; sodium borohydride; and water, etc. These foaming agents can be used singly or in the form of a mixture of two or more.

Examples of the film substrate of the support include non-stretched films of a polyethylene resin, and non-stretched films, monoaxially stretched films and biaxially stretched films of a polypropylene resin and a polyethylene terephthalate resin, and the like. The film substrate can have any thickness without limitation, but the thickness is usually 10 to 1000 μm.

Examples of commercially available pressure-sensitive adhesives, which can reduce the adhesive strength through curing by ultraviolet rays, include those such as "Acrybase LKG-1701 (trade name)" and "Acrybase LKG-1702 (trade name)" from Fujikura Kasei Co., Ltd. Examples of commercially available supports having such a pressure-sensitive adhesive layer include those which can reduce the adhesive strength by thermal foaming, such as "REVALPHA (trade name)" from Nitto Denko Corporation.

In accordance with at least one embodiment, the production method according to at least one embodiment includes (B) a step of cutting the hard coat laminate having the temporarily bonded support into a predetermined shape by at least one processing method selected from the group consisting of router machining, water-jet machining, laser machining, and punching to prepare a cut article having a temporarily bonded support.

In accordance with at least one embodiment, the article can be cut into any size without limitation. The size can be determined according to applications thereof such as a display face plate for a touch panel and a transparent conductive substrate.

In router machining, cutting is performed with a mill rotating at high speed. The advantage of router machining is the smoothness of the resulting cut surface. When the method is controlled with a computer, it is also excellent in dimensional stability and reproductivity.

In water-jet machining, water pressurized to an ultra-high pressure (typically, about 4000 atmospheric pressure at most) is jetted from a nozzle having an extremely small diameter (usually, inner diameter of about 0.1 mm), and cutting is performed using the energy of the ultra-high pressure water output at high speed and high density. This method is advantageous because of small thermal affection on the target object. A mixture of water and a polishing agent can also be used in some cases.

In laser machining, the target object is cut by melting and evaporating the material of the target object at the intended cutting position through irradiation of a laser focused on the cutting position.

In punching, the target object is punched by applying a pressure to the target object placed on a Thomson die with a steel cutter held on a support base. This method is advantageous because of low cost of the die, a large tolerability in design and a variety of shapes for cutting, and high productivity.

Among these methods, preferred are router machining and laser machining. More preferred is router machining.

In accordance with at least one embodiment, the mill preferably used in router machining can be those having blades with a cylindrical and round end and those having blades with a ball end. Such a mill can conveniently produce articles including the hard coat layer having a greater surface hardness.

Figure 2:
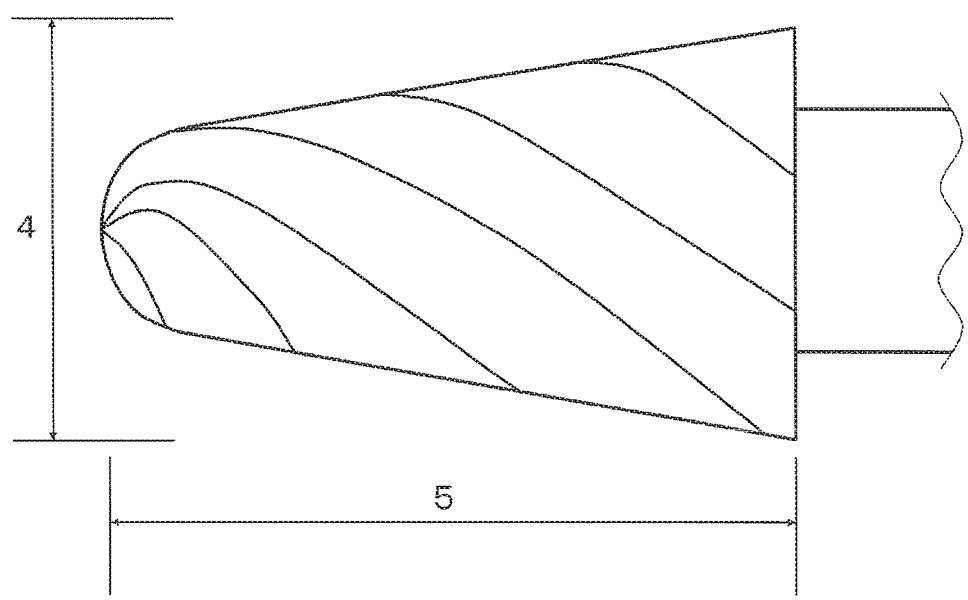
FIG. 2 is a conceptual drawing illustrating an example of a mill having a blade with a cylindrical and round end according to an embodiment of the invention.

Here, the mill having a blade with a cylindrical and round end indicates a mill having an approximately conical shape with a round vertex as shown in the conceptual drawing in FIG. 2. The blade is spirally disposed from the vertex (including the portion near the vertex).

Figure 3:
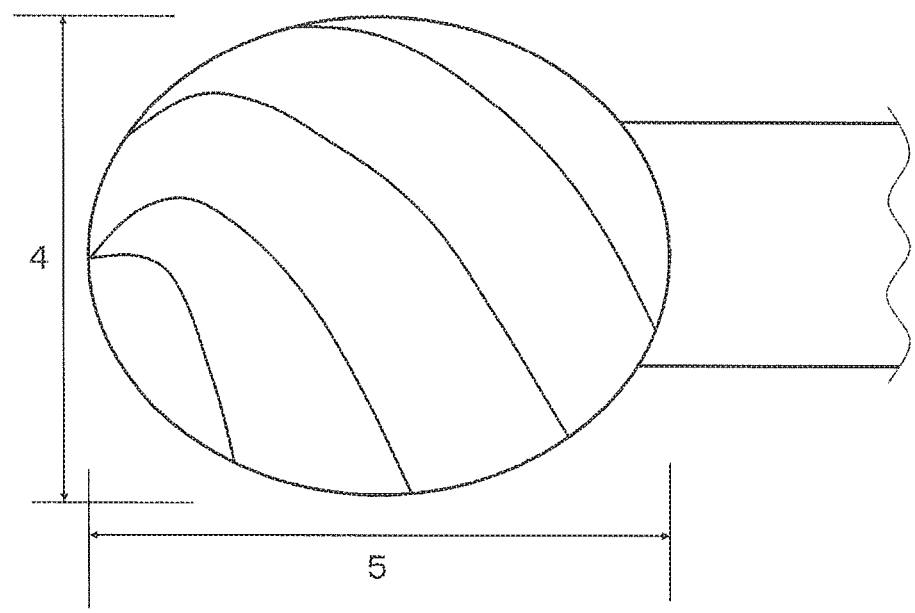
FIG. 3 is a conceptual drawing illustrating an example of a mill having a blade with a ball end according to an embodiment of the invention.
Figure 4:
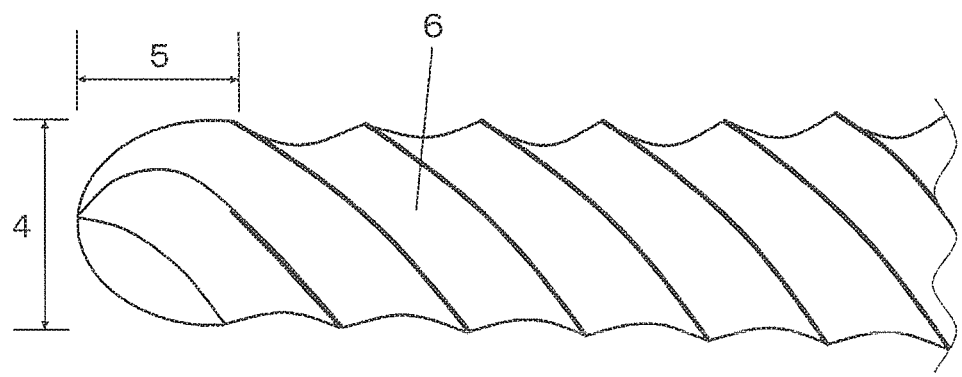
FIG. 4 is a conceptual drawing illustrating an example of a mill provided with a nick having a blade with a ball end according to an embodiment of the invention.

In accordance with at least one embodiment, the mill having a blade with a ball end indicates a mill having an approximately spherical or semi-spherical shape at its end as shown in the conceptual drawings in FIG. 3 and FIG. 4. The blade is spirally disposed from the spherical or semi-spherical vertex (including the portion near the vertex).

In accordance with at least one embodiment, the piece number of the blade (i.e. the number of threads of the spiral) can be 2, 3, 4, or 5 or more (which is also referred to as a rotary blade in some cases). Although any of them can be used, preferred are a 4-piece blade and a rotary blade. These blades can enhance the processing rate and provide a clear cut end.

In accordance with at least one embodiment, the mill that can be preferably used is a mill provided with a nick. Such a mill can ensure discharge of cut chips generated by router machining without adhering to the article.

Here, the mill provided with a nick indicates a mill having a spiral groove disposed from the end of the blade to the support rod so as to continuously extend between the spiral blades, as shown in the conceptual drawing in FIG. 4.

Furthermore, the mill that can be preferably used is a mill having a blade with an end composed of a superhard alloy. Such a mill can conveniently produce articles including the hard coat layer having a greater surface hardness.

In accordance with at least one embodiment, the superhard alloy is usually a composite material prepared by sintering a carbide of a Group 4a, 5a, or 6a metal in the periodic table with an iron-based metal such as iron, cobalt, or nickel. Examples of the superhard alloy include tungsten carbide-cobalt alloys, tungsten carbide-titanium carbide-cobalt alloys, tungsten carbide-tantalum carbide-cobalt alloys, tungsten carbide-titanium carbide-tantalum carbide-cobalt alloys, tungsten carbide-nickel alloys, and tungsten carbide-nickel-chromium alloys.

In accordance with at least one embodiment, the surface of the mill having a blade with an end composed of a superhard alloy may be coated with a hard substance, such as titanium nitride, titanium carbonitride, titanium aluminum nitride, and aluminum chromium nitride, by a method such as chemical vapor deposition or physical vapor deposition.

The production method according to at least one embodiment includes (C) a step of applying at least one selected from the group consisting of heat and active energy rays to the cut article having the temporarily bonded support to reduce an adhesive strength between the support and the article to 2 N/2.5 cm or less.

Here, the method of measuring the adhesive strength is as described above.

When the article is used as a touch panel member, the support is peeled and removed. Unfortunately, high adhesive strength between the support and the article can often cause a great bending stress applied to the article during the peeling of the support, resulting in deficits such as generation of cracks in the article. In contrast, the adhesive strength between the support and the article is required to be large to some extent in step (B) for cutting the article, because insufficient adhesive strength may result in curling the support such that the object of prevention of fouling cannot be achieved. Accordingly, in accordance with at least one embodiment, the adhesive strength between the support and the article is reduced to 2 N/2.5 cm or less with heat or active energy rays after step (B) so that the bending stress can be barely applied to the article during peeling of the support. As a result, deficits such as generation of cracks in the article can be prevented.

In accordance with at least one embodiment, the adhesive strength after step (C) is performed is 2 N/2.5 cm or less, preferably 1.5 N/2.5 cm or less, still more preferably 1.0 N/2.5 cm or less to suppress deficits such as generation of cracks in the article. In contrast, the adhesive strength after step (C) is performed is preferably 0.01 N/2.5 cm or more, more preferably 0.05 N/2.5 cm or more so that the support can achieve the object of preventing the article from fouling right up until the time when the article is used as a touch panel member.

Any method of reducing the adhesive strength by heat can be used without limitation as long as the method uses heat. Examples of the method include a method of passing the article cut in step (B) (having a support in this stage) through a tunnel furnace heated to a desired temperature at a rate to obtain a desired furnace residence time; a method of contacting the article cut in step (B) with a hot plate or a metal roll preheated to a desired temperature for a desired time and at a desired pressure; and a method of irradiating the article cut in step (B) with a near-infrared radiation at a desired intensity for a desired time.

Any method of reducing the adhesive strength with active energy rays can be used without limitation as long as the method uses active energy rays. Examples thereof include a method of irradiating the article cut in step (B) with light from an apparatus including a high pressure mercury lamp or a metal halide lamp as a light source at 10 to 10000 mJ/cm$^2$.

In accordance with at least one embodiment, the adhesive strength between the support and the article before step (C) is preferably 3 to 12 N/2.5 cm. When the adhesive strength falls within this range, the object of preventing the article in step (B) from fouling can be certainly achieved and the adhesive strength can be readily reduced to 2 N/2.5 cm or less in step (C).

In accordance with at least one embodiment, the article produced by the production method according to at least one embodiment can be used as a display face plate for a touch panel and a transparent conductive substrate. For this reason, cutting lines for cutting out the hard coat laminate and cutting lines for forming an opening or the like in the article usually contains a curved cutting line having a curvature radius of 0.1 to 20 mm in the plan view of the article. The production method according to at least one embodiment can provide such an article having a curved cutting line having a small curvature radius as described above without causing deficits such as generation of cracks in the hard coat.

Figure 5:
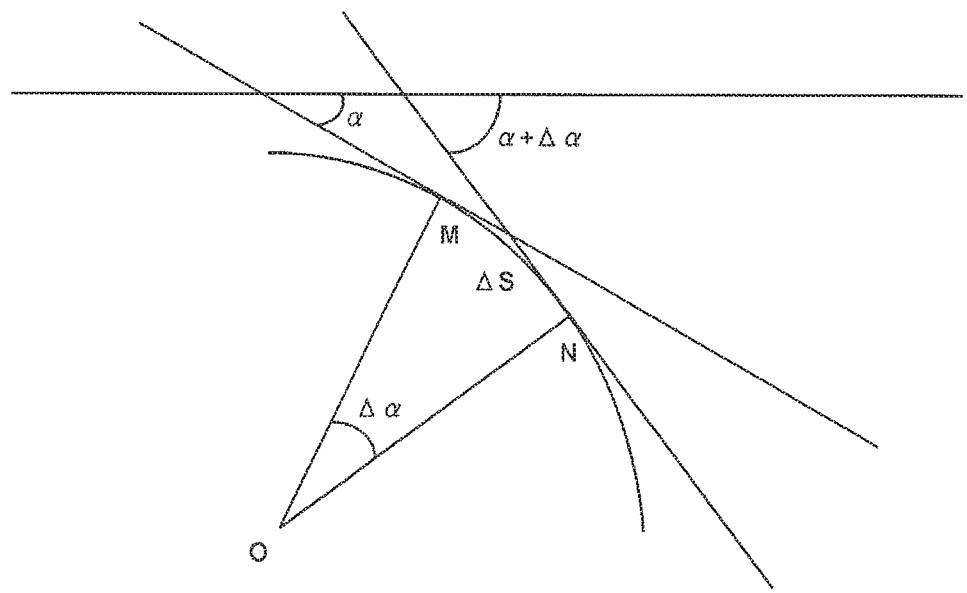
FIG. 5 is a drawing for illustrating a curvature radius according to an embodiment of the invention.

A radius of curvature is defined as follows. In FIG. 5, the length from the point M to the point N in the objective curve is denoted as $\Delta S$; the difference between the slope of the tangent line at the point M and the slope of the tangent line at the point N as $\Delta \alpha$; and the intersection of the line which is perpendicular to the tangent line at the point M and intersects with the tangent line at the point M and the line which is perpendicular to the tangent line at the point N and intersects with the tangent line at the point N, as O. In the case where $\Delta S$ is sufficiently small, the curve from the point M to the point N can be approximated to an arc. The radius in this case is defined as the radius of curvature. Further, the radius of curvature is denoted as R. Then, $\angle MON = \Delta \alpha$. In the case where $\Delta S$ is sufficiently small, $\Delta \alpha$ is also sufficiently small and therefore $\Delta S = R \Delta \alpha$. As the result, $R = \Delta S / \Delta \alpha$.

2. Article Formed from Hard Coat Laminate

In accordance with at least one embodiment, the article according to at least one embodiment is formed from a hard coat laminate including a hard coat layer and a poly(meth) acrylic imide resin layer as a transparent resin film layer sequentially disposed from the topmost surface layer side.

Because the poly(meth)acrylic imide resin layer has high rigidity, even though the hard coat laminate includes a hard coat layer made taking cutting processability into account, the laminate can exhibit sufficiently high surface hardness. In other words, since the hard coat laminate has such a layer configuration, both high surface hardness and excellent cutting processability can be achieved simultaneously. For this reason, the article according to at least one embodiment formed from the hard coat laminate can have surface hardness suitable for a display face plate for a touch panel and a transparent conductive substrate, and deficits such as generation of cracks in the hard coat are not caused in spite of a curved cutting line having a small curvature radius.

In accordance with at least one embodiment, the hard coat layer of the hard coat laminate is not limited to a single layer, and may be composed of two or more layers. Among these hard coat layers, at least one layer is formed as the topmost surface layer of the hard coat laminate so that the article according to at least one embodiment can have high surface hardness and high abrasion resistance. The poly(meth) acrylic imide resin layer is not limited to a single layer, and may be composed of two or more layers. Furthermore, the hard coat laminate may include any optional layer(s) other than the hard coat layer and the poly(meth)acrylic imide resin layer, as desired. Examples of such an optional layer include an anchor coat layer, a pressure-sensitive adhesive layer, a transparent conductive layer, a high refractive index layer, a low refractive index layer, and an anti-glare layer, etc.

In the hard coat laminate, the surface of the hard coat layer on the topmost surface layer side has (i) a pencil hardness of preferably 7 H or more, more preferably 8 H or more, still more preferably 9 H or more. The pencil hardness referred to herein is measured according to the procedure (1) described below.

In accordance with at least one embodiment, the hard coat laminate is required to have high transparency and be not colored because the article according to at least one embodiment can be used as a display face plate for a touch panel and a transparent conductive substrate. For this reason, the hard coat laminate has (ii) a total light transmittance of usually 85% or more, preferably 90% or more, more preferably 92% or more. The total light transmittance referred to herein is measured according to the procedure (2) in Examples below. A higher total light transmittance is preferred. The hard coat laminate has (iii) a haze of usually 2.5% or less, preferably 2.0% or less, more preferably 1.5% or less. The haze referred to herein is measured according to the procedure (3) in Examples below. A lower haze is preferred. Furthermore, the hard coat laminate has a yellowness index of preferably 3 or less, more preferably 2 or less, still more preferably 1 or less. The yellowness index referred to herein is measured according to the procedure (7) in Examples below.

Furthermore, the hard coat laminate preferably has (iv) a minimum bending radius of 40 mm or less. The minimum bending radius referred to herein is measured according to the procedure (4) in Examples below. Satisfaction of the property (iv) can facilitate the handling of the hard coat laminate as a film roll, which leads to advantages such as production efficiency. A smaller minimum bending radius is preferred. The minimum bending radius is more preferably 30 mm or less, still more preferably 20 mm or less.

In accordance with at least one embodiment, the minimum bending radius indicates a bending radius immediately before cracks are generated on the surface of the bent portion of the hard coat laminate when bended, which is an index representing the bending limit. The bend radius is defined in the same manner as in the curvature radius described later.

Any coating material for forming the hard coat layer can be used without limitation as long as the coating material can be formed into a hard coat layer having high transparency, high difficulty in coloring, high surface hardness, and high abrasion resistance and excellent cutting processability. Examples of preferred coating materials for forming the hard coat layer include an active energy ray-curable resin composition.

In accordance with at least one embodiment, the active energy ray-curable resin composition may be as described in the production method in accordance with at least one embodiment of the invention.

In accordance with at least one embodiment, the method for obtaining the hard coat layer using the coating material for forming a hard coat layer, such as an active energy ray-curable resin composition, on the poly(meth)acrylic imide resin layer or other optional layer(s) can be performed by a known web application method without limitation. Specifically, examples of the method include methods such as roll coating, gravure coating, reverse coating, roll brush, spray coating, air knife coating, and die coating.

In accordance with at least one embodiment, the hard coat layer formed as the topmost surface layer of the hard coat laminate preferably has a thickness of 17 µm or more from the viewpoint of having a pencil hardness of 7 H or more. The thickness of the hard coat layer is more preferably 20 µm or more, still more preferably 25 µm or more. The hard coat layer has a thickness of preferably 100 µm or less, more preferably 50 µm or less from the viewpoint of keeping excellent cutting processability and handling properties of the web.

In accordance with at least one embodiment, the hard coat laminate preferably has the hard coat layer formed on both surfaces thereof. For example, usually, significantly different properties are required for the touch surface and the printing surface of a touch panel display face plate. Such different required properties can be satisfied through formation of hard coat layers on the touch surface and the printing surface (on both the surface layers of the hard coat laminate) so as to meet the respective required properties. Curl of the hard coat laminate can be prevented through appropriately optimizing the thickness of each of the hard coat layers, by which a cutting operation can be facilitated.

In accordance with at least one embodiment, the poly(meth)acrylic imide resin layer is the layer composed of a poly(meth)acrylic imide resin film. This layer serves as a transparent film substrate for forming the hard coat layer.

In accordance with at least one embodiment, the poly(meth)acrylic imide resin film is a transparent multilayer film having preferably a first poly(meth)acrylic imide resin layer ($\alpha 1$), an aromatic polycarbonate resin layer ($\beta$), and a second poly(meth)acrylic imide resin layer ($\alpha 2$) directly laminated in this order. The poly(meth)acrylic imide resin has high surface hardness while the cutting processability is often insufficient. In contrast, the aromatic polycarbonate resin has high cutting processability while the surface hardness is often insufficient. For this reason, the use of the transparent multilayer film having the above layer configuration can compensate for disadvantages of these resins, facilitating the production of the hard coat laminate having both high surface hardness and high cutting processability.

In accordance with at least one embodiment, the poly(meth)acrylic imide resin is a thermoplastic resin keeping high transparency, high surface hardness, and high rigidity of acrylic resins as they are while the characteristics of excellent heat resistance and dimensional stability of polyimide resins are introduced and a disadvantage thereof, i.e., coloring from light yellow to reddish brown is improved. Such poly(meth)acrylic imide resins are disclosed in JP 2011-519999 A, for example. The term "poly(meth)acrylic imide" referred to herein is intended to include both polyacrylic imide or polymethacrylic imide.

Examples of preferred poly(meth)acrylic imide resins used in at least one embodiment include those having a yellowness index (measured according to JIS K7105:1981) of 3 or less. The yellowness index is more preferably 2 or less, still more preferably 1 or less. Examples of preferred poly(meth)acrylic imide resins include those having a melt mass-flow rate (measured according to ISO1133 under the conditions at 260° C. and 98.07 N) of 0.1 to 20 g/10 min from the viewpoint of the extrusion load during film formation and the stability of the melted film. The melt mass-flow rate ranging from 0.5 to 10 g/10 min is more preferred. Furthermore, the poly(meth)acrylic imide resin preferably has a glass transition temperature of 150° C. or more from the viewpoint of heat resistance. The glass transition temperature is more preferably 170° C. or more.

In accordance with at least one embodiment, the poly(meth)acrylic imide resins may further include an optional additive(s) such as thermoplastic resins other than the poly(meth)acrylic imide resins; pigments, inorganic fillers, organic fillers and resin fillers; and lubricants, antioxidants, weatherability stabilizers, heat stabilizers, mold release agents, antistatic agents, and surfactants, as desired, to an extent not impairing the embodiments of the invention. The amount of the optional component(s) to be used is usually about 0.01 to 10 parts by mass relative to 100 parts by mass of the poly(meth)acrylic imide resin.

Examples of commercially available poly(meth)acrylic imide resins include "PLEXIMID TT70 (trade name)" from Evonik Industries AG.

In accordance with at least one embodiment, the transparent poly(meth)acrylic imide resin layer can have any thickness without limitation, as desired. The transparent resin film may have a thickness of usually 20 μm or more, preferably 50 μm or more from the viewpoint of handling properties when the article of at least one embodiment is produced from the above hard coat laminate. If the article of at least one embodiment is used as a display face plate for a touch panel, the transparent resin film may have a thickness of usually 100 μm or more, preferably 200 μm or more, more preferably 300 μm or more from the viewpoint of keeping the rigidity. The transparent resin film may have a thickness of usually 1500 μm or less, preferably 1200 μm or less, more preferably 1000 μm or less from the viewpoint of meeting the requirements for further thinning touch panels. If the article of at least one embodiment is used in other applications not requiring as high rigidity as in a display face plate for a touch panel, the poly(meth)acrylic imide resin layer may have a thickness of usually 250 μm or less, preferably 150 μm or less from the viewpoint of economy.

When the poly(meth)acrylic imide resin film is the transparent multilayer film having the layer α1, the layer β, and the layer α2 directly laminated in this order, each of these layers can have any thickness without limitation, as desired. If such a hard coat laminate including the multilayer film is used as a display face plate for a touch panel, the layer α1 can have any layer thickness without limitation. The layer α1 may have a layer thickness of usually 20 μm or more, preferably 40 μm or more, more preferably 60 μm or more from the viewpoint of keeping high surface hardness. The layer α2 can have any layer thickness without limitation. The layer α2 preferably has the same layer thickness as that of the layer α1 from the viewpoint of the curl resistance of the hard coat laminate. The layer β can have any layer thickness without limitation. The layer β may have a layer thickness of usually 20 μm or more, preferably 80 μm or more, more preferably 120 μm or more from the viewpoint of the cutting processability of the hard coat laminate.

Here, the term "same layer thickness" is as described in the production method in accordance with at least one embodiment of the invention In accordance with at least one embodiment, the poly (meth)acrylic imide resins used in the layer α1 and the layer α2 can be the same as those used in the layer α.

For the poly(meth)acrylimide resin used for the above α1 layer and the poly(meth)acrylimide resin used for the above α2 layer, those having different resin properties, for example, poly(meth)acrylimide resins having different melt mass flow rates or glass transition temperatures, may be used. Those having the same resin properties are preferably used, however, from the viewpoint of the curling resistance of the transparent multilayer film. For example, using the same lot of the same grade for the poly(meth)acrylimide resins is one of the preferred embodiments.

As the aromatic polycarbonate resin used for the above β layer, for example, one or a mixture of two or more types of aromatic polycarbonate resins such as a polymer obtained by the interfacial polymerization of an aromatic dihydroxy compound such as bisphenol A, dimethylbisphenol A, or 1,1-bis(4-hydroxyphenyl)-3,3,5-trimethylcyclohexane and phosgene; and a polymer obtained by the transesterification reaction of an aromatic dihydroxy compound such as bisphenol A, dimethylbisphenol A, or 1,1-bis(4-hydroxyphenyl)-3,3,5-trimethylcyclohexane and a carbonic acid diester such as diphenyl carbonate can be used.

In accordance with at least one embodiment, the optional components which can be contained in the aromatic polycarbonate resin are as described in the production method in accordance with at least one embodiment of the invention.

In accordance with at least one embodiment, the method for obtaining the above poly(meth)acrylimide resin film of the α layer is not particularly limited. Examples thereof include a method including the steps of (A) continuously extruding a melted film of the poly(meth)acrylimide resin from a T die using an apparatus including an extruder and the T die; and (B) supplying and charging the above melted film of the poly(meth)acrylimide resin between a first rotating or circulating mirror-finished body and a second rotating or circulating mirror-finished body and pressing the melted film.

Similarly, the method for obtaining the above transparent multilayer film in which the layer (α1); the layer (β); and the layer (α2) are directly laminated in this order is not particularly limited. Preferred examples thereof include a method including the steps of (A') continuously coextruding a melted film of a transparent multilayer film in which a first poly(meth)acrylimide resin layer (α1); an aromatic polycarbonate resin layer (β); and a second poly(meth)acrylimide resin layer (α2) are directly laminated in this order from a T die using a coextrusion apparatus including an extruder and the T die; and (B') supplying and charging the above melted film of the transparent multilayer film between a first rotating or circulating mirror-finished body and a second rotating or circulating mirror-finished body and pressing the melted film.

In the above step (A) or the above step (A'), as the above T die, any known one can be used. Examples thereof include a manifold die, a fishtail die, and a coat hanger die.

As the above coextrusion apparatus, any known one can be used. Examples thereof include feed-block type, multi-manifold type, and stack-plate type coextrusion apparatuses.

As the above extruder to be used in the above step (A) or the above step (A'), any known one can be used. Examples thereof include a single-screw extruder, a corotating twin-screw extruder, and a counter-rotating twin-screw extruder.

In addition, in order to suppress the deterioration of the poly(meth)acrylimide resin and the aromatic polycarbonate resin, one of preferred methods is that the interior of the extruder is subjected to a purge operation with nitrogen.

In accordance with at least one embodiment, the poly (meth)acrylimide resin is a resin having high moisture absorbency and therefore is preferably dried before being subjected to film formation. In addition, it is also preferred that the dried poly(meth)acrylimide resin is directly transported from the dryer to the extruder and charged. The set temperature of the dryer is preferably 100 to 150° C. In addition, it is also preferred that the extruder (typically, the measuring zone at the screw tip of the extruder) is equipped with a vacuum vent.

In accordance with at least one embodiment, the temperature of the above T die used in the above step (A) or the above step (A') is preferably set at 260° C. or more in order to stably perform the step of continuously extruding or coextruding the melted film of the poly(meth)acrylimide resin or the above melted film of the transparent multilayer film. More preferably, the temperature is 270° C. or more. In addition, in order to suppress the deterioration of the poly (meth)acrylimide resin and the aromatic polycarbonate resin, the temperature of the T die is preferably set at 350° C. or less.

In accordance with at least one embodiment, the ratio (R/T) of the lip opening (R) to the thickness (T) of the resulting poly(meth)acrylic imide resin film or transparent multilayer film is preferably 1 to 10. The ratio is more preferably 1.5 to 5. The ratio (R/T) of 10 or less can prevent retardation. The ratio (R/T) of 1 or more can keep an appropriate extrusion load.

Examples of the above first mirror-finished body used in the above step (B) or the above step (B') include a mirror-finished roll and a mirror-finished belt. In addition, examples of the above second mirror-finished body include a mirror-finished roll and a mirror-finished belt.

In accordance with at least one embodiment, the above mirror-finished roll is a roll whose surface is mirror-finished. The above mirror-finished roll includes those made of metals, ceramics, and silicone rubbers. In addition, the surface of the mirror-finished roll can be subjected to a chrome plating treatment, an iron-phosphorus alloy plating treatment, a hard carbon treatment by PVD or CVD, or the like for the purpose of protection from corrosion and scratching.

In accordance with at least one embodiment, the above mirror-finished belt is a seamless belt usually made of a metal whose surface is mirror-finished. The mirror-finished belt is arranged, for example, to loop around a pair of belt rollers and circulate between them. In addition, the surface of the mirror-finished belt can be subjected to a chrome plating treatment, an iron-phosphorus alloy plating treatment, a hard carbon treatment by PVD or CVD, or the like for the purpose of protection from corrosion and scratching.

In accordance with at least one embodiment, the above mirror finishing is not limited and can be performed by any method. Examples thereof include a method of performing polishing using fine abrasive grains to set the arithmetic average roughness (Ra) of the surface of the above mirror-finished body at preferably 100 nm or less, more preferably 50 nm or less, and set the ten-point average roughness (Rz) at preferably 500 nm or less, more preferably 250 nm or less.

Though there is no intention of being bound by any theory, it can be considered that a poly(meth)acrylimide resin film or a transparent multilayer film having excellent transparency, surface smoothness, and appearance is obtained by the above film forming method. That is because the melted film of the poly(meth)acrylimide resin film or the transparent multilayer film is pressed by the first mirror-finished body and the second mirror-finished body, and thus the highly smooth surface states of the first mirror-finished body and the second mirror-finished body are transferred to the film to correct faulty portions such as die streaks.

In order that the above transfer of the surface states is performed well, the surface temperature of the first mirror-finished body is preferably 100° C. or more, more preferably 120° C. or more, and further preferably 130° C. or more. On the other hand, in order to prevent the development on the film of appearance faults (exfoliation marks) accompanying the peeling-off from the first mirror-finished body, the surface temperature of the first mirror-finished body is made to be preferably 200° C. or lower, and more preferably 160° C. or lower.

In order that the above transfer of the surface states is performed well, the surface temperature of the second mirror-finished body is preferably 20° C. or more, more preferably 60° C. or more, and further preferably 100° C. or more. On the other hand, in order to prevent the development on the film of appearance faults (exfoliation marks) accompanying the peeling-off from the second mirror-finished body, the surface temperature of the second mirror-finished body is made to be preferably 200° C. or lower, and more preferably 160° C. or lower.

In accordance with at least one embodiment, the surface temperature of the first mirror-finished body is preferably higher than the surface temperature of the second mirror-finished body. This is because the film is held by the first mirror-finished body and fed to the next transport roll.

When the hard coat is formed, the hard coat-layer forming surface or both surfaces of the poly(meth)acrylic imide resin film or the transparent multilayer film serving as a transparent film substrate may previously be subjected to an easy-adhesion treatment such as a corona discharge treatment or an anchor coat formation in order to enhance the adhesive strength.

In accordance with at least one embodiment, the method of the easy-adhesion treatment is as described in the production method in accordance with at least one embodiment of the invention.

In accordance with at least one embodiment, the article according to at least one embodiment has a curved cutting line having a curvature radius of 0.1 to 20 mm in the plan view of the article. The term "plan view" referred to herein is intended to mean one of drawings of the article drawn by orthographic projection, i.e., an overhead view of the article seen from above in the vertical direction, and can also be referred to as a "top view." A display face plate for a touch panel and a transparent conductive substrate can be prepared through cutting out the hard coat laminate. The cutting lines for cutting out the hard coat laminate and cutting lines for forming an opening or the like in the article usually contains a curved portion having a small curvature radius. Because the article according to at least one embodiment is formed from the hard coat laminate, the article of at least one embodiment has surface hardness suitable for a display face plate for a touch panel and a transparent conductive substrate, and deficits such as generation of cracks in the hard coat are not caused in spite of a curved cutting line having a small curvature radius. Here, the term "curvature radius" is as described in the production method in accordance with at least one embodiment of the invention.

Examples of the cutting method include methods such as router machining, water-jet machining, laser machining, and punching. These methods can be used in combination.

In router machining, cutting is performed with a mill rotating at high speed. The advantage of router machining is the smoothness of the resulting cut surface. When the method is controlled with a computer, it is also excellent in dimensional stability and reproductivity.

In water-jet machining, water pressurized to an ultra-high pressure (typically, about 4000 atmospheric pressure at most) is jetted from a nuzzle having an extremely small diameter (usually, inner diameter of about 0.1 mm), and cutting is performed using the energy of the ultra-high pressure water output at high speed and high density. This method is advantageous because of small thermal affection on the target object. A mixture of water and a polishing agent can also be used in some cases.

In laser machining, the target object is cut by melting and evaporating the material of the target object at the intended cutting position through irradiation of a laser focused on the cutting position.

In punching, the target object is punched by applying a pressure to the target object placed on a Thomson die with a steel cutter held on a support base. This method is advantageous because of low cost of the die, a large tolerability in design and a variety of shapes for cutting, and high productivity.

Among these methods, preferred are router machining and laser machining. More preferred is router machining.

In accordance with at least one embodiment, the mill preferably used in router machining can be those having blades with a cylindrical and round end and those having blades with a ball end. Such a mill can conveniently produce articles including the hard coat layer having a greater surface hardness.

Here, the mill having a blade with a cylindrical and round end indicates a mill having an approximately conical shape with a round vertex as shown in the conceptual drawing in FIG. 2. The blade is spirally disposed from the vertex (including the portion near the vertex).

In accordance with at least one embodiment, the mill having a blade with a ball end indicates a mill having an approximately spherical or semi-spherical shape at its end as shown in the conceptual drawings in FIG. 3 and FIG. 4. The blade is spirally disposed from the spherical or semi-spherical vertex (including the portion near the vertex).

In accordance with at least one embodiment, the piece number of the blade (i.e. the number of threads of the spiral) can be 2, 3, 4, or 5 or more (which is also referred to as a rotary blade in some cases). Although any of them can be used, preferred are a 4-piece blade and a rotary blade. These blades can enhance the processing rate and provide a clear cut end.

In accordance with at least one embodiment, the mill that can be preferably used is a mill provided with a nick. Such a mill can ensure discharge of cut chips generated by router machining without adhering to the article.

Here, the mill provided with a nick indicates a mill having a spiral groove disposed from the end of the blade to the support rod so as to continuously extend between the spiral blades, as shown in the conceptual drawing in FIG. 4.

Furthermore, the mill that can be preferably used is a mill having a blade with an end composed of a superhard alloy. Such a mill can conveniently produce articles including the hard coat layer having a greater surface hardness.

In accordance with at least one embodiment, the superhard alloy is usually a composite material prepared by sintering a carbide of a Group 4a, 5a, or 6a metal in the periodic table with an iron-based metal such as iron, cobalt, or nickel. Examples of the superhard alloy include tungsten carbide-cobalt alloys, tungsten carbide-titanium carbide-cobalt alloys, tungsten carbide-tantalum carbide-cobalt alloys, tungsten carbide-titanium carbide-tantalum carbide-cobalt alloys, tungsten carbide-nickel alloys, and tungsten carbide-nickel-chromium alloys.

In accordance with at least one embodiment, the surface of the mill having a blade with an end composed of a superhard alloy may be coated with a hard substance, such as titanium nitride, titanium carbonitride, titanium aluminum nitride, and aluminum chromium nitride, by a method such as chemical vapor deposition or physical vapor deposition.

EXAMPLES

Embodiments of the invention will now be described by way of Examples, but the various embodiments of the invention will not be limited to these.

Methods of Measuring and Evaluating Physical Properties (1) Pencil Hardness (Surface Hardness)

In accordance with at least one embodiment, the pencil hardness was measured according to JIS K5600-5-4 by using a pencil "UNI" (trade name) of Mitsubishi Pencil Co., Ltd under the condition of a load of 750 g. The pencil hardness values for both surfaces of each article when used as a touch panel display face plate are shown in the tables as the measured value for the touch surface/measured value for the printing surface.

(2) Total Light Transmittance

In accordance with at least one embodiment, the total light transmittance was measured according to JIS K7361-1:1997 by using a turbidimeter "NDH2000" (trade name) of Nippon Denshoku Industries Co., Ltd.

(3) Haze

In accordance with at least one embodiment, the haze was measured according to JIS K7136:2000 by using a turbidimeter "NDH2000" (trade name) of Nippon Denshoku Industries Co., Ltd.

(4) Minimum Bending Radius

With reference to Bending Formability (B method) in JIS-K6902:2007, a test piece of a hard coat laminate was conditioned at a temperature of 23° C.±2° C. and a relative humidity of 50±5% for 24 hours, and thereafter the test piece was bent to form a curve at a bending temperature of 23° C.±2° C. at a bending line with a direction perpendicular to the machine direction of the hard coat laminate film so that the hard coat layer on the topmost surface layer side of the hard coat laminate (i.e. the touch surface side if the article was used as a touch panel display face plate) was on the outer side, and for the resultant, measurement was performed. The radius of the front face of the test piece (or the shaping jig) having the smallest radius of the front face among test pieces with no crack generated was defined as the minimum bending radius. The "front face" has the same meaning as the term regarding a shaping jig in the B method defined in Paragraph 18.2 in JIS K6902:2007.

(5) Cutting Processability (State of Curved Cutting Line)

An article cut into a shape shown in FIG. 1 was provided with a cut hole having both ends having a curvature radius of 0.5 mm. The cut end surfaces of both the ends were observed visually or with a microscope (×100) to evaluate the states thereof according to the following criteria. The cut end surface of a circular cut hole having a radius of 0.1 mm was observed visually or with a microscope (×100) to evaluate the state thereof according to the following criteria. The results of the former evaluation–the results of the latter evaluation were shown in this order in the tables.

⊚: No crack or burr was found even in microscopic observation.

○: No crack was found even in microscopic observation but a burr was found.

Δ: No crack was found in visual observation but a crack was found in microscopic observation.

X: A crack was found even in visual observation.

(6) Surface Smoothness (Appearance of Surface)

In accordance with at least one embodiment, the surfaces (both surfaces) of an article were visually observed while being irradiated with light from a fluorescent lamp at a variety of angles of incidence, and were evaluated according to the following criteria.

⊚: The surface exhibited no undulations nor flaws, and even when being held up nearby to the light, no impression of cloudiness.

○: When being held up nearby to the light, some portions of the surface exhibited a slight impression of cloudiness.

Δ: When being looked closely into, the surface had a few recognized undulations and flaws. It also gave an impression of cloudiness.

X: The surface had a large number of recognized undulations and flaws, and also gave a definite impression of cloudiness.

(7) Color Tone

In accordance with at least one embodiment, the yellowness index (YI) was measured according to JIS K7105:1981 by using a chromaticity meter "SolidSpec-3700" (trade name) manufactured by Shimadzu Corp.

(8) Linear Coefficient of Expansion

In accordance with at least one embodiment, the linear coefficient of expansion was measured according to JIS K7197:1991. The measurement used a thermomechanical analyzer (TMA)"EXSTAR6000" (trade name) of Seiko Instruments Inc. The test piece had a size of 20 mm in length and 10 mm in width, and was sampled so that the machine direction (MD) of the film became the longitudinal direction of the test piece. The condition regulation of the test piece was carried out at a temperature of 23° C.±2° C. and a relative humidity of 50±5% for 24 hours. For the purpose of measuring the dimensional stability as a value of a physical property of the film, the condition regulation at the highest temperature in the measurement was not carried out. The interchuck distance was made to be 10 mm; and the temperature program was made to be such that the test piece was held at a temperature of 20° C. for 3 min, and thereafter heated at a temperature-rise rate of 5° C./min up to 270° C. The linear coefficient of expansion was calculated from a temperature-test piece length curve acquired under the condition that the low temperature-side temperature was set at 30° C. and the high temperature-side temperature was set at 250° C.

(9) Abrasion Resistance

An article was placed on a Gakushin (Japan Society for the Promotion of Science)-type tester according to JIS L0849 so that the touch surface-side hard coat of the article when used as a touch panel display face plate was turned upward. Then, a #0000 steel wool was attached to a friction pin of the Gakushin tester; a load of 500 g was mounted; and the surface of the test piece was rubbed 100 times reciprocatingly. The surface was visually observed and the evaluation was carried out according to the following criteria.

⊚: There was no scratches.
◯: There was 1 to 5 scratches.
Δ: There was 6 to 10 scratches.
X: There was 11 or more scratches.

Raw Materials Used (α) A poly(meth)acrylic imide resin:
(α-1) a poly(meth)acrylimide "PLEXIMID TT70" (trade name) of Evonik Industry AG (β) An aromatic polycarbonate resin:
(β-1) An aromatic polycarbonate "Calibre 301-4" (trade name) from Sumika Styron Polycarbonate Limited (γ) Coating materials for forming hard coat
(γ-1)
The following components: 50 parts by mass of component γa, 50 parts by mass of component γb, 50 parts by mass of component γc, 2 parts by mass of component γd, 1 part by mass of component γe, 4 parts by mass of component γg, 1 part by mass of component γh, and 20 parts by mass of component γi were mixed and stirred thereby obtaining the coating material.

(γ-2)
The following components: 50 parts by mass of component γa, 50 parts by mass of component γb, 50 parts by mass of component γc, 2 parts by mass of component γd, 0.5 parts by mass of component γf, 4 parts by mass of component γg, 1 part by mass of component γh, and 20 parts by mass of component γi were mixed and stirred thereby obtaining the coating material.

(γ-3)
The following components: 25 parts by mass of component γa, 75 parts by mass of component γb, 50 parts by mass of component γc, 2.5 parts by mass of component γd, 1 part by mass of component γe, 4 parts by mass of component γg, 1 part by mass of component γh, and 25 parts by mass of component γi were mixed and stirred thereby obtaining the coating material.

(γ-4)
The following components: 100 parts by mass of component γb, 50 parts by mass of component γc, 3 parts by mass of component γd, 0.5 parts by mass of component γf, 4 parts by mass of component γg, 1 part by mass of component γh, and 30 parts by mass of component γi were mixed and stirred thereby obtaining the coating material.

(γ-5)
The following components: 100 parts by mass of component γa, 80 parts by mass of component γc, 2 parts by mass of component γd, 1 part by mass of component γe, 4 parts by mass of component γg, 1 part by mass of component γh, and 20 parts by mass of component γi were mixed and stirred thereby obtaining the coating material.

(γ-6)
The following components: 100 parts by mass of component γa, 80 parts by mass of component γc, 2 parts by mass of component γd, 0.5 parts by mass of component γf, 4 parts by mass of component γg, 1 part by mass of component γh, and 20 parts by mass of component γi were mixed and stirred thereby obtaining the coating material.

(γa) dipentaerythritol hexaacrylate from Nippon Kayaku Co., Ltd.

(γb) a mixed coating material "Laromer PO9026" (trade name) of polyether acrylate and nano silica (average particle size: 20 nm) at 50:50 (mass ratio) from BASF SE (γc) a surface-modified nano silica (average particle size: 15 nm) dispersion liquid in methyl isobutyl ketone (solid content: 30% by mass) "MIBK-ST" (trade name) from Nissan Chemical Industries, Ltd.

(γd) an acrylic silane coupling agent (3-acryloxypropyltrimethoxysilane "KBM-5103" (trade name) from Shin-Etsu Chemical Co., Ltd.

(γe) a fluorine-based water-repellent "Fluorolink AD1700" (trade name) from Solvay Solexis Inc.

(γf) a surface regulator "BYK-399" (trade name) from BYK Japan KK (γg) a phenyl ketone photopolymerization initiator (1-hydroxycyclohexyl phenyl ketone) "SB-PI714" (trade name) from Shuang-Bang Industrial Corp.

(γh) a trifunctional polyisocyanate "CORONATE HX" (trade name) from Nippon Polyurethane Industry Co., Ltd.

(γi) 1-methoxy-2-propanol

[Table 1]

TABLE 1

|  |  | Coating material for forming hard coat | | | | | |
|---|---|---|---|---|---|---|---|
|  |  | γ-1 | γ-2 | γ-3 | γ-4 | γ-5 | γ-6 |
| Proportion of | γa | 50 | 50 | 25 |  | 100 | 100 |
| components | γb | 50 | 50 | 75 | 100 |  |  |
| (parts by mass) | γc | 50 | 50 | 50 | 50 | 80 | 80 |
|  | γd | 2 | 2 | 2.5 | 3 | 2 | 2 |
|  | γe | 1 |  | 1 |  | 1 |  |
|  | γf |  | 0.5 |  | 0.5 |  | 0.5 |
|  | γg | 4 | 4 | 4 | 4 | 4 | 4 |
|  | γh | 1 | 1 | 1 | 1 | 1 | 1 |
|  | γi | 20 | 20 | 25 | 30 | 20 | 20 |

(δ) Support
(δ-1)
100 parts by mass of an ultraviolet light-curable pressure-sensitive adhesive "Acrybase LKG-1702" (trade name)

from Fujikura Kasei Co., Ltd., 6.1 parts by mass of an isocyanate curing agent "LKG-17 HN02" (trade name) from Fujikura Kasei Co., Ltd., 0.85 parts by mass of a photopolymerization initiator "KN-101" (trade name) from Fujikura Kasei Co., Ltd., and 50 parts by mass of ethyl acetate were mixed with stirring to prepare a pressure-sensitive adhesive. The pressure-sensitive adhesive was applied onto one surface of a polyethylene terephthalate biaxially stretched film having a thickness of 50 μm with a film Meyer bar coater so that the thickness of the pressure-sensitive adhesive after drying was 10 μm, by which a support was prepared.

(δ-2)

100 parts by mass of an ultraviolet light-curable pressure-sensitive adhesive "Acrybase LKG-1701" (trade name) from Fujikura Kasei Co., Ltd., 3.0 parts by mass of an isocyanate curing agent "LKG-17 HN01" (trade name) from Fujikura Kasei Co., Ltd., 1.5 parts by mass of a photopolymerization initiator "KN-101" (trade name) from Fujikura Kasei Co., Ltd., and 50 parts by mass of ethyl acetate were mixed with stirring to prepare a pressure-sensitive adhesive. The pressure-sensitive adhesive was applied onto one surface of a polyethylene terephthalate biaxially stretched film having a thickness of 50 μm with a film Meyer bar coater so that the thickness of the pressure-sensitive adhesive after drying was 10 μm, by which a support was prepared.

Figure 6:
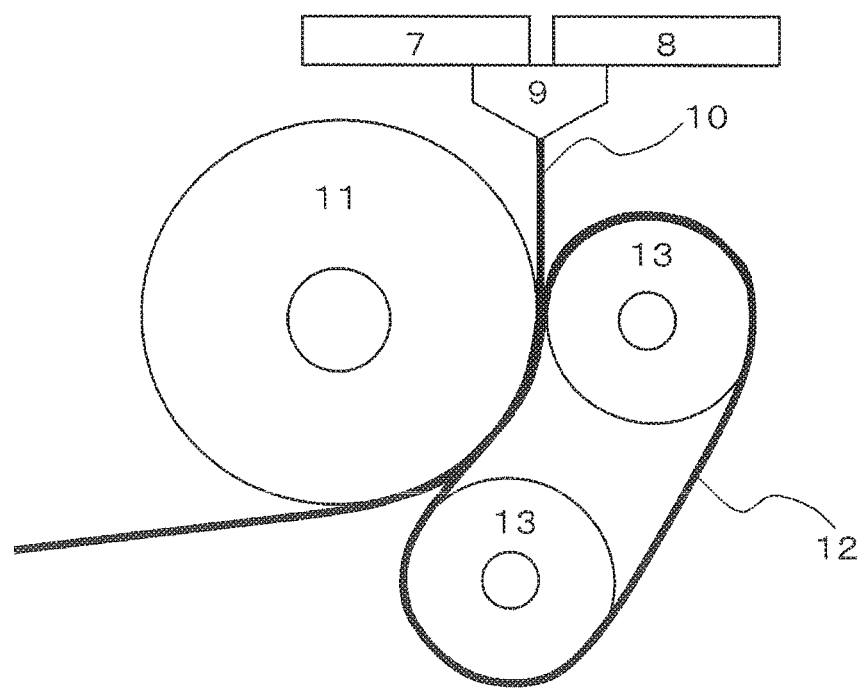
FIG. 6 is a conceptual drawing of a co-extrusion film forming apparatus used in Example 1 according to an embodiment of the invention.

(a) Transparent Resin Film Substrates (a1) A transparent multilayer film:

A melted film of (α-1) fed from an extruder 7 as both outer layers (the layer α1 and the layer α2) and a melted film of (β-1) fed from an extruder 8 as an intermediate layer (the layer β) were continuously extruded from a co-extrusion T die 9 of a two-kind three-layer multi-manifold type by using a co-extrusion film forming apparatus having a structure shown in FIG. 6. A melted film 10 of a transparent multilayer film having the layer α1, the layer β, and the layer α2 directly laminated in this order was thereby prepared. The melted film 10 was fed between a rotating mirror-finished roll 11 and a mirror-finished belt 12 circulating along the outer peripheral surface of the mirror-finished roll so that the layer α1 was disposed on the mirror-finished roll 11 side, and was pressed into a transparent multilayer film having a total thickness of 250 μm in which the layer thickness of the layer α1 was 80 μm, the layer thickness of the layer β was 90 μm, and the layer thickness of the layer α2 was 80 μm. At this time, the conditions were set as follows: the drying temperature before film formation of (α-1) was 150° C., and that of (β-1) was 100° C. The setting temperatures of the extruder 7 were C1/C2/C3/C4/C5/AD=260/290 to 290° C., and the setting temperatures of the extruder 8 were C1/C2/C3/C4/C5/C6/AD=260/280/280/260 to 260/270° C. The extruders 7 and 8 were both purged with nitrogen. A vacuum vent was used. The setting temperature of the T die 9 was 300° C., and the lip opening was 0.5 mm. The setting temperature of the mirror-finished roll 11 was 130° C., and the setting temperature of the mirror-finished belt 12 was 120° C. The pressure to the film was 1.4 MPa, and the take-up rate was 6.5 m/min.

(a2) A single-layer film of poly(meth)acrylic imide resin:

The above resin (α-1) was formed into a film having a thickness of 250 μm with an apparatus provided with a 50 mm extruder (L/D=29, a double-flight screw having CR=1.86 was installed), a T die having a die width of 680 mm, and a take-up apparatus having a mechanism to press the melted film with a mirror-finished roll and a mirror-finished belt. At this time, the conditions were set as follows: the setting temperatures of the extruder were C1/C2/C3/AD=280/300/320/320° C. The setting temperature of the T die was 320° C., and the lip opening of the T die was 0.5 mm. The setting temperature of the mirror-finished roll was 140° C., and the setting temperature of the mirror-finished belt was 120° C. The pressure of the mirror-finished belt was 1.4 MPa, and the take-up rate was 5.6 m/min.

(a3) A biaxially stretched polyethylene terephthalate film "DIAFOIL" (trade name) from Mitsubishi Plastics, Inc. with a thickness: 250 μm (a4) An acrylic resin film "TECHNOLLOY" (trade name) from Sumitomo Chemical Co., Ltd. with a thickness: 250 μm (a5) The above resin (β-1) was formed into a film having a thickness of 250 μm with an apparatus provided with a 50 mm extruder (L/D=29, a double-flight screw having CR=1.86 was installed), a T die having a die width of 680 mm, and a take-up apparatus having a mechanism to press the melted film with a mirror-finished roll and a mirror-finished belt. At this time, the conditions were set as follows: the setting temperatures of the extruder were C1/C2/C3/AD=280/300/320/320° C. The setting temperature of the T die was 320° C., and the lip opening of the T die was 0.5 mm. The setting temperature of the mirror-finished roll was 140° C., and the setting temperature of the mirror-finished belt was 120° C. The pressure of the mirror-finished belt was 1.4 MPa, and the take-up rate was 5.6 m/min.

1. Method of Producing Article Formed from Hard Coat Laminate

Example 1

Production of a Hard Coat Laminate:

Both surfaces of the above film (a1) were subjected to a corona discharge treatment at an amount of treatment of 167 W·min/m² (with a discharged power: 500 W, a length of the discharge electrode: 1 m, and a line velocity: 3 m/min). Both surfaces had a wetting index of 64 mN/m. In the next step, the coating material (γ-1) was applied onto the surface of the layer α1 as a coating material for forming the touch-surface side hard coat layer with a die coater so that the thickness after curing was 25 μm. The coating material (γ-2) was then applied onto the surface of the layer α2 as a coating material for forming the printing-surface side hard coat layer with a die coater such that the thickness after curing was 25 μm, by which a hard coat laminate was prepared. The resulting hard coat laminate was evaluated for various embodiments discussed above.

Step (A):

The pressure-sensitive adhesive layer of the above support (δ-1) was temporarily bonded to both surfaces of the resulting hard coat laminate.

Step (B):

The laminate obtained from the support and the hard coat laminate was cut into an article with a support having a shape shown in the plan view of FIG. 1 with a router machining apparatus automatically controlled by a computer. The mill used at this time had a superhard alloy four-piece blade with a cylindrical and round end and was provided with a nick. The diameter of the blade was appropriately selected so as to match the places to be machined.

Step (C):

The resulting article with the support was irradiated with ultraviolet light from a high pressure mercury lamp as a light source at 100 mJ/cm². While the adhesive strength between the support and the article before irradiation was 3.8 N/2.5 cm (see Example 1C below), the adhesive strength between the support and the article after irradiation was reduced to 0.5 N/2.5 cm, and the support was easily peeled and removed off. The resulting article was evaluated for various embodiments discussed above. The results are shown in Table 2.

Example 1C

An article was prepared and evaluated in the same manner as in Example 1 except that irradiation with ultraviolet light in step (C) was not performed. At this time, the adhesive strength between the support and the article was 3.8 N/2.5 cm. Fine cracks were visually found in several places of the hard coat layer of the article after the support was peeled and removed off. For this reason, the evaluations (5) to (9) above were omitted. The results are shown in Table 2.

Example 2

An article was prepared and evaluated in the same manner as in Example 1 except that (δ-2) was used instead of (δ-1) as the support. While the adhesive strength between the support and the article before irradiation was 11.3 N/2.5 cm (see Example 2C below), the adhesive strength between the support and the article after irradiation was reduced to 2.0 N/2.5 cm. Exfoliation marks after peeling and removal of the support which were not found visibly but were visible with a loupe (with a magnification of ×10) were slightly found in the article. The resulting article was evaluated for various embodiments discussed above. The results are shown in Table 2.

Example 3

An article was prepared and evaluated in the same manner as in Example 1 except that (δ-2) was used instead of (δ-1) as the support, and the amount of irradiation in step (C) was changed from 100 mJ/cm$^2$ to 200 mJ/cm$^2$. The adhesive strength between the support and the article after irradiation was reduced to 1.5 N/2.5 cm, and the support was easily peeled and removed off. The resulting article was evaluated for various embodiments discussed above. The results are shown in Table 2.

Example 2C

An article was prepared and evaluated in the same manner as in Example 1 except that (δ-2) was used instead of (δ-1) as the support, and the irradiation with ultraviolet light in step (C) was not performed. At this time, the adhesive strength between the support and the article was 11.3 N/2.5 cm. Cracks were visually found in several places of the hard coat layer of the article after the support was peeled and removed off. For this reason, the evaluations (5) to (9) above were omitted. The results are shown in Table 2.

Example 4

An article was prepared and evaluated in the same manner as in Example 1 except that the above (γ-3) was used instead of the above (γ-1) as the coating material for forming the touch-surface side hard coat layer when the article was used as a touch panel display face plate, (γ-4) was used instead of (γ-2) as the coating material for forming the touch-surface side hard coat layer, and the thickness after curing was 30 μm. While the adhesive strength between the support and the article before irradiation was 4.0 N/2.5 cm, the adhesive strength between the support and the article after irradiation was reduced to 0.6 N/2.5 cm, and the support was easily peeled and removed off. The resulting article was evaluated for various embodiments discussed above. The results are shown in Table 2.

Example 5

An article was prepared and evaluated in the same manner as in Example 1 except that a carbon dioxide gas ($CO_2$) laser having a wavelength of 9.3 μm was used in step (B) instead of the router machining apparatus. The adhesive strength between the support and the article after irradiation was 0.5 N/2.5 cm, and the support was easily peeled and removed off. The resulting article was evaluated for various embodiments discussed above. The results are shown in Table 3. In the evaluation (5) of the state of curved cutting line, the end surfaces had a slightly yellow color.

Example 6

An article was prepared and evaluated in the same manner as in Example 1 except that a mill with a ball end was used in step (B) instead of the mill with a cylindrical and round end. The adhesive strength between the support and the article after irradiation was 0.5 N/2.5 cm, and the support was easily peeled and removed off. The resulting article was evaluated for various embodiments discussed above. The results are shown in Table 3.

Example 7

An article was prepared and evaluated in the same manner as in Example 1 except that the film (a2) was used instead of the film (a1). The adhesive strength between the support and the article after irradiation was 0.5 N/2.5 cm, and the support was easily peeled and removed off. The resulting article was evaluated for various embodiments discussed above. The results are shown in Table 3.

Example 8

An article was prepared and evaluated in the same manner as in Example 1 except that the film (a3) was used instead of the film (a1). The adhesive strength between the support and the article after irradiation was 0.5 N/2.5 cm, and the support was easily peeled and removed off. The resulting article was evaluated for various embodiments discussed above. The measurement of the linear coefficient of expansion was impossible because the article significantly contracted. The results are shown in Table 3.

Example 9

An article was prepared and evaluated in the same manner as in Example 1 except that the film (a4) was used instead of the film (a1). The adhesive strength between the support and the article after irradiation was 0.6 N/2.5 cm, and the support was easily peeled and removed off. The resulting article was evaluated for various embodiments discussed above. The results are shown in Table 3.

Example 10

An article was prepared and evaluated in the same manner as in Example 1 except that the film (a5) was used instead of the film (a1). The adhesive strength between the support and the article after irradiation was 0.5 N/2.5 cm, and the support was easily peeled and removed off. The resulting article was evaluated for various embodiments discussed above. The results are shown in Table 3.

[Table 2]

TABLE 2

|  |  | Example 1 | Example 2 | Example 3 | Example 4 | Example 1C | Example 2C |
|---|---|---|---|---|---|---|---|
| Conditions of production | Transparent film substrate | a1 | a1 | a1 | a1 | a1 | a1 |
|  | Coating material for touch surface | (γ-1) | (γ-1) | (γ-1) | (γ-3) | (γ-1) | (γ-1) |
|  | Coating material for printing surface | (γ-2) | (γ-2) | (γ-2) | (γ-4) | (γ-2) | (γ-2) |
|  | Support | (δ-1) | (δ-2) | (δ-2) | (δ-1) | (δ-1) | (δ-2) |
|  | Processing method | Router | Router | Router | Router | Router | Router |
|  | Mill | Cylindrical and round end | Cylindrical and round end | Cylindrical and round end | Cylindrical and round end | Cylindrical and round end | Cylindrical and round end |
|  | Amount of irradiation mJ/cm$^2$ | 100 | 100 | 200 | 100 | Not irradiated | Not irradiated |
|  | Adhesive strength N/2.5 cm | 0.5 | 2.0 | 1.5 | 0.6 | 3.8 | 11.3 |
| Results of evaluation | (1) Pencil hardness | 9H/7H | 9H/7H | 9H/7H | 8H/6H | 9H/7H | 9H/7H |
|  | (2) Total light transmittance % | 91 | 91 | 91 | 91 | 91 | 91 |
|  | (3) Haze % | 0.3 | 0.3 | 0.3 | 0.3 | 0.3 | 0.3 |
|  | (4) Minimum bending radius mm | 35 | 35 | 35 | 20 | 35 | 35 |
|  | (5) Cutting processability | ⓞ-◎ | ⓞ-◎ | ⓞ-◎ | ⓞ-◎ | Evaluations (5) to (9) not performed | Evaluations (5) to (9) not performed |
|  | (6) Surface appearance | ◎ | ○ | ◎ | ◎ |  |  |
|  | (7) Yellowness index | 0.5 | 0.5 | 0.5 | 0.5 |  |  |
|  | (8) Linear coefficient of expansion | 15 | 15 | 15 | 15 |  |  |
|  | (9) Abrasion resistance | ◎ | ◎ | ◎ | ◎ |  |  |

[Table 3]

TABLE 3

|  |  | Example 5 | Example 6 | Example 7 | Example 8 | Example 9 | Example 10 |
|---|---|---|---|---|---|---|---|
| Conditions of production | Transparent film substrate | a1 | a1 | a2 | a3 | a4 | a5 |
|  | Coating material for touch surface | (γ-1) | (γ-1) | (γ-1) | (γ-1) | (γ-1) | (γ-1) |
|  | Coating material for printing surface | (γ-2) | (γ-2) | (γ-2) | (γ-2) | (γ-2) | (γ-2) |
|  | Support | (δ-1) | (δ-1) | (δ-1) | (δ-1) | (δ-1) | (δ-1) |
|  | Processing method | Laser | Router | Router | Router | Router | Router |
|  | Mill | — | Ball end | Cylindrical and round end | Cylindrical and round end | Cylindrical and round end | Cylindrical and round end |
|  | Amount of irradiation mJ/cm$^2$ | 100 | 100 | 100 | 100 | 100 | 100 |
|  | Adhesive strength N/2.5 cm | 0.5 | 0.5 | 0.5 | 0.5 | 0.6 | 0.5 |
| Results of evaluation | (1) Pencil hardness | 9H/7H | 9H/7H | 9H/7H | 5H/3H | 6H/4H | 5H/3H |
|  | (2) Total light transmittance % | 91 | 91 | 91 | 91 | 91 | 91 |
|  | (3) Haze % | 0.3 | 0.3 | 0.3 | 0.3 | 0.3 | 0.3 |
|  | (4) Minimum bending radius mm | 35 | 35 | 40 | 30 | 35 | 30 |
|  | (5) Cutting processability | ⓞ-◎ | ⓞ-◎ | ⓞ-◎ | ⓞ-◎ | ○-○ | ⓞ-◎ |
|  | (6) Surface appearance | ◎ | ◎ | ◎ | ◎ | ◎ | ◎ |
|  | (7) Yellowness index | 0.5 | 0.5 | 0.5 | 0.5 | 0.5 | 0.5 |
|  | (8) Linear coefficient of expansion | 15 | 15 | 12 | Measurement impossible | 70 | 80 |
|  | (9) Abrasion resistance | ◎ | ◎ | ◎ | ◎ | ◎ | ◎ |

The production methods of Examples 1 to 10 according to at least one embodiment provided the articles formed from the hard coat laminate which have high transparency, high surface hardness, high abrasion resistance, high bending resistance, high surface smoothness, and a good appearance and can be suitably used as a display face plate for a touch panel and a transparent conductive substrate, without causing deficits such as generation of cracks. In particular, articles also having high heat resistance and high dimensional stability were prepared in Examples 1 to 7. In contrast, in Examples 1C and 2C, step (C) of the production method according to at least one embodiment was not performed, leading to high adhesive strength. For this reason, deficits such as generation of cracks in the hard coat were caused.

2. Article Formed from Hard Coat Laminate

Example 11

The hard coat laminate produced according to Example 1 was cut into an article having a shape shown in the plan view of FIG. 1 with a router machining apparatus automatically controlled by a computer. The mill used at this time had a superhard alloy four-piece blade with a cylindrical and round end and was provided with a nick. The diameter of the blade was appropriately selected so as to match the places to be machined. The resulting article was evaluated for various embodiments discussed above. The results are shown in Table 4.

Example 12

An article was prepared and evaluated in the same manner as in Example 11 except that the above (γ-3) was used instead of the above (γ-1) as the coating material for forming a hard coat layer for the touch surface when the article was used as a touch panel display face plate, the above (γ-4) was used instead of the above (γ-2) for the printing surface, and the thickness after curing was 30 μm. The results are shown in Table 4.

Example 13

An article was prepared and evaluated in the same manner as in Example 11 except that a carbon dioxide gas ($CO_2$)

laser having a wavelength of 9.3 μm was used instead of the router machining apparatus in the production of the article (c). The results are shown in Table 4. In the evaluation (5) of the state of curved cutting lines, the end surfaces had a slightly yellow color.

Example 14

An article was prepared and evaluated in the same manner as in Example 11 except that a mill with a ball end was used instead of the mill with a cylindrical and round end in the production of the article (c). The results are shown in Table 4.

Example 15

An article was prepared and evaluated in the same manner as in Example 11 except that the film (a2) was used instead of the film (a1). The results are shown in Table 4.

Example 16

An article was prepared and evaluated in the same manner as in Example 11 except that the film (a2) was used instead of the film (a1), the above (γ-3) was used instead of the above (γ-1) as the coating material for forming a hard coat layer for the touch surface, the above (γ-4) was used instead of the above (γ-2) for the printing surface, and the thickness after curing was 30 μm. The results are shown in Table 4.

Example 3C

An article was prepared and evaluated in the same manner as in Example 11 except that the film (a3) was used instead of the film (a1). The measurement of the linear coefficient of expansion was impossible because the article significantly contracted. The results are shown in Table 5.

Example 4C

An article was prepared and evaluated in the same manner as in Example 11 except that the film (a3) was used instead of the film (a1), the above (γ-5) was used instead of the above (γ-1) as the coating material for forming a hard coat layer for the touch surface, the above (γ-6) was used instead of the above (γ-2) for the printing surface. The measurement of the linear coefficient of expansion was impossible because the article significantly contracted. The results are shown in Table 5.

Example 5C

An article was prepared and evaluated in the same manner as in Example 11 except that the film (a4) was used instead of the film (a1). The results are shown in Table 5.

Example 6C

An article was prepared and evaluated in the same manner as in Example 11 except that the film (a4) was used instead of the film (a1), the above (γ-5) was used instead of the above (γ-1) as the coating material for forming a hard coat layer for the touch surface, and the above (γ-6) was used instead of the above (γ-2) for the printing surface. The results are shown in Table 5.

Example 7C

An article was prepared and evaluated in the same manner as in Example 11 except that the film (a5) was used instead of the film (a1). The results are shown in Table 5.

Example 8C

An article was prepared and evaluated in the same manner as in Example 11 except that the film (a5) was used instead of the film (a1), the above (γ-5) was used instead of the above (γ-1) as the coating material for forming a hard coat layer for the touch surface, and the above (γ-6) was used instead of the above (γ-2) for the printing surface. The results are shown in Table 5.

[Table 4]

TABLE 4

| | | Example 11 | Example 12 | Example 13 | Example 14 | Example 15 | Example 16 |
|---|---|---|---|---|---|---|---|
| Conditions of production | Transparent film substrate | a1 | a1 | a1 | a1 | a2 | a2 |
| | Coating material for touch surface | γ-1 | γ-3 | γ-1 | γ-1 | γ-1 | γ-3 |
| | Coating material for printing surface | γ-2 | γ-4 | γ-2 | γ-2 | γ-2 | γ-4 |
| | Processing method | Router | Router | Laser | Router | Router | Router |
| | Shape of mill | Cylindrical and round end | Cylindrical and round end | — | Ball end | Cylindrical and round end | Cylindrical and round end |
| Results of evaluation | (1) Pencil hardness | 9H/7H | 8H/6H | 9H/7H | 9H/7H | 9H/7H | 8H/6H |
| | (2) Total light transmittance % | 91 | 91 | 91 | 91 | 91 | 91 |
| | (3) Haze % | 0.3 | 0.3 | 0.3 | 0.3 | 0.3 | 0.3 |
| | (4) Minimum bending radius mm | 35 | 20 | 35 | 35 | 40 | 30 |
| | (5) Cutting processability | ⊚-○ | ⊚-○ | ⊚-○ | ⊚-○ | ⊚-○ | ⊚-○ |
| | (6) Surface appearance | ⊚ | ⊚ | ⊚ | ⊚ | ⊚ | ⊚ |
| | (7) Yellowness index | 0.5 | 0.5 | 0.5 | 0.5 | 0.5 | 0.5 |
| | (8) Linear coefficient of expansion ppm | 15 | 15 | 15 | 15 | 12 | 12 |
| | (9) Abrasion resistance | ⊚ | ⊚ | ⊚ | ⊚ | ⊚ | ⊚ |

[Table 5]

TABLE 5

|  |  | Example 3C | Example 4C | Example 5C | Example 6C | Example 7C | Example 8C |
|---|---|---|---|---|---|---|---|
| Conditions of production | Transparent film substrate | a3 | a3 | a4 | a4 | a5 | a5 |
|  | Coating material for touch surface | γ-1 | γ-5 | γ-1 | γ-5 | γ-1 | γ-5 |
|  | Coating material for printing surface | γ-2 | γ-6 | γ-2 | γ-6 | γ-2 | γ-6 |
|  | Processing method | Router | Router | Router | Router | Router | Router |
|  | Shape of mill | Cylindrical and round end | Cylindrical and round end | Cylindrical and round end | Cylindrical and round end | Cylindrical and round end | Cylindrical and round end |
| Results of evaluation | (1) Pencil hardness | 5H/3H | 7H/7H | 6H/4H | 8H/8H | 5H/3H | 7H/7H |
|  | (2) Total light transmittance % | 91 | 91 | 91 | 91 | 91 | 91 |
|  | (3) Haze % | 0.3 | 0.3 | 0.3 | 0.3 | 0.3 | 0.3 |
|  | (4) Minimum bending radius mm | 30 | 80 | 35 | 100 | 30 | 80 |
|  | (5) Cutting processability | ⊚-⊚ | Δ-X | ○-○ | X-X | ⊚-⊚ | Δ-Δ |
|  | (6) Surface appearance | ⊚ | ⊚ | ⊚ | ⊚ | ⊚ | ⊚ |
|  | (7) Yellowness index | 0.5 | 0.5 | 0.5 | 0.5 | 0.5 | 0.5 |
|  | (8) Linear coefficient of expansion ppm | Measurement impossible | Measurement impossible | 80 | 80 | 70 | 70 |
|  | (9) Abrasion resistance | ⊚ | ⊚ | ⊚ | ⊚ | ⊚ | ⊚ |

All the articles in Examples 11 to 16 according to at least one embodiment each had high surface hardness, a low linear coefficient of expansion, a small minimum bending radius, and high cutting processability, and also had high transparency, high abrasion resistance, a good appearance, and good color tone.

In contrast, in Examples 1C to 6C wherein the articles were formed from the hard coat laminate not including a poly(meth)acrylic imide resin layer, the use of the hard coat layer having high cutting processability resulted in articles having low surface hardness, whereas the use of the hard coat layer having high surface hardness resulted in articles having a large minimum bending radius and low cutting processability. These articles in Examples 1C to 6C all had poor dimensional stability.

Embodiments of the invention provide non-obvious advantages over the conventional art. For example, according to the production method according to a first embodiment, an article including a hard coat laminate, having high transparency, high surface hardness, high abrasion resistance, high surface smoothness and a good appearance and capable of being suitably used as a display face plate for a touch panel and a transparent conductive substrate, can be provided without causing deficits such as generation of cracks in the hard coat laminate when the support temporarily bonded for prevention of fouling is peeled off after a cutting operation.

Although the article according to a second embodiment has a curved cutting line having a small curvature radius, deficits such as generation of cracks in the hard coat cannot be caused. The article includes a hard coat laminate including a hard coat layer and a poly(meth)acrylic imide resin layer sequentially disposed from the topmost surface layer side, and therefore also has high transparency, high surface hardness, high bending resistance, high surface smoothness, a good appearance, high rigidity, high heat resistance, and high dimensional stability. For this reason, this article can be suitably used as a display face plate for a touch panel and a transparent conductive substrate.

The production method according to at least one embodiment can provide an article having high transparency, high surface hardness, high abrasion resistance, high surface smoothness, and a good appearance without causing deficits such as generation of cracks in the hard coat laminate when peeling off the support temporarily bonded for fouling prevention after a cutting operation. Accordingly, the article prepared by the production method can be suitably used as a display face plate for a touch panel and a transparent conductive substrate.

Moreover, although the article according to at least one embodiment has a curved cutting line having a small curvature radius, deficits such as generation of cracks in the hard coat are not caused, and the article also has high transparency, high surface hardness, high bending resistance, high surface smoothness, a good appearance, high rigidity, high heat resistance, and high dimensional stability. For this reason, the article can be suitably used as a display face plate for a touch panel and a transparent conductive substrate.

Terms used herein are provided to explain embodiments, not limiting the invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the invention may suitably comprise, consist or consist essentially of the elements disclosed and may be practiced in the absence of an element not disclosed. According to at least one embodiment, it can be recognized by those skilled in the art that certain steps can be combined into a single step.

The terms and words used in the specification and claims should not be interpreted as being limited to typical meanings or dictionary definitions, but should be interpreted as having meanings and concepts relevant to the technical scope of the invention based on the rule according to which an inventor can appropriately define the concept of the term to describe the best method he or she knows for carrying out the invention.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

Occurrences of the phrase "according to an embodiment" herein do not necessarily all refer to the same embodiment.

Therefore, the embodiments disclosed herein are not intended to limit the present invention but to describe the embodiments of the invention, and the embodiments will not limit the spirit and scope of the present embodiments of the invention. The scope of the embodiments of the present invention should be interpreted from the appended claims, and all techniques within the range of equivalency should be interpreted as being included in the scope of the present embodiments of the invention.

REFERENCE SIGNS LIST

1: Circular cut hole having a radius of 0.1 mm
2: Cut hole having both ends having a curvature radius of 0.5 mm
3: Corner having a curvature radius of 10 mm
4: Blade diameter of mill
5: Blade length of mill
6: Nick of mill
7: Extruder 1
8: Extruder 2
9: Co-extrusion T die of two-kind three-layer multi-manifold type
10: Melted film
11: Mirror-finished roll
12: Mirror-finished belt
13: A pair of belt rollers

The invention claimed is:

1. A method of producing an article formed from a hard coat laminate comprising a hard coat layer and a transparent resin film layer sequentially disposed from a topmost surface layer side, the method comprising:
   (A) temporarily bonding a pressure-sensitive adhesive layer of a support with at least one surface having the pressure-sensitive adhesive layer thereon to at least one surface of the hard coat laminate to prepare a hard coat laminate having a temporarily bonded support;
   (B) cutting the hard coat laminate having the temporarily bonded support into a predetermined shape by at least one processing method selected from the group consisting of router machining, water-jet machining, laser machining, and punching to prepare a cut article having a temporarily bonded support; and
   (C) applying at least one selected from the group consisting of heat and active energy rays to the cut article having the temporarily bonded support to reduce an adhesive strength between the support and the article to 2 N/2.5 cm or less.

2. The method according to claim 1, wherein router machining is used in step (B).

3. The method according to claim 2, wherein router machining is performed with a mill having a blade with a cylindrical and round end or with a ball end.

4. The method according to claim 3, wherein the mill used in router machining is a mill provided with a nick.

5. The method according to claim 3, wherein the end of the blade of the mill is composed of a superhard alloy.

6. The method according to claim 1, wherein the hard coat laminate satisfies the following property (i):
   (i) at least one surface of the hard coat laminate has a pencil hardness of 7 H or more.

7. The method according to claim 1, wherein the hard coat laminate satisfies the following properties (ii) and (iii):
   (ii) the hard coat laminate has a total light transmittance of 90% or more; and
   (iii) the hard coat laminate has a haze of 2.0% or less.

8. The method according to claim 1, wherein the hard coat laminate satisfies the following property (iv):
   (iv) the hard coat laminate has a minimum bending radius of 40 mm or less.

9. The method according to claim 1, wherein the article has a curved cutting line having a curvature radius of 0.1 to 20 mm in a plan view thereof.

10. The method according to claim 1, wherein the hard coat laminate comprises a hard coat layer (H) and a poly(meth)acrylic imide resin layer ($\alpha$) sequentially disposed from a topmost surface layer side.

11. The method according to claim 1, wherein the hard coat laminate comprises:
   a first hard coat layer (H1);
   a poly(meth)acrylic imide resin layer ($\alpha$); and
   a second hard coat layer (H2), which are sequentially disposed from a topmost surface layer side.

12. The method according to claim 1, wherein the hard coat laminate comprises:
   a first hard coat layer (H1);
   a first poly(meth)acrylic imide resin layer ($\alpha$1);
   an aromatic polycarbonate resin layer ($\beta$);
   a second poly(meth)acrylic imide resin layer ($\alpha$2); and
   a second hard coat layer (H2), which are sequentially disposed from a topmost surface layer side, and
   the layer $\alpha$1, the layer $\beta$, and the layer $\alpha$2 are directly laminated in this order.

13. An article prepared by the method according to claim 1.

14. Use of the article according to claim 13 as a touch panel member.

15. An article formed from a hard coat laminate comprising a hard coat layer and a poly(meth)acrylic imide resin layer as a transparent resin film layer sequentially disposed from a topmost surface layer side, and having a curved cutting line having a curvature radius of 0.1 to 20 mm in a plan view of the article.

16. The article according to claim 15, wherein the hard coat laminate comprises:
   a first hard coat layer (H1);
   a poly(meth)acrylic imide resin layer ($\alpha$); and
   a second hard coat layer (H2), which are sequentially disposed from a topmost surface layer side.

17. The article according to claim 15, wherein the hard coat laminate comprises:
   a first hard coat layer (H1);
   a first poly(meth)acrylic imide resin layer ($\alpha$1);
   an aromatic polycarbonate resin layer ($\beta$);
   a second poly(meth)acrylic imide resin layer ($\alpha$2); and
   a second hard coat layer (H2), which are sequentially disposed from a topmost surface layer side, and
   the layer $\alpha$1, the layer $\beta$, and the layer $\alpha$2 are directly laminated in this order.

18. The article according to claim 15, wherein the hard coat laminate satisfies the following property (i):
   (i) at least one surface of the hard coat laminate has a pencil hardness of 7 H or more.

19. The article according to claim 15, wherein the hard coat laminate satisfies the following properties (ii) and (iii):
   (ii) the hard coat laminate has a total light transmittance of 90% or more; and
   (iii) the hard coat laminate has a haze of 2.0% or less.

20. The article according to claim 15, wherein the hard coat laminate satisfies the following property (iv):
   (iv) the hard coat laminate has a minimum bending radius of 40 mm or less.

21. Use of the article according to claim 15 as a touch panel member.

* * * * *